US011900614B2

(12) United States Patent
Zheng et al.

(10) Patent No.: US 11,900,614 B2
(45) Date of Patent: Feb. 13, 2024

(54) VIDEO DATA PROCESSING METHOD AND RELATED APPARATUS

(71) Applicant: TENCENT TECHNOLOGY (SHENZHEN) COMPANY LIMITED, Shenzhen (CN)

(72) Inventors: Yuanli Zheng, Shenzhen (CN); Zelong Yin, Shenzhen (CN); Nianhua Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 336 days.

(21) Appl. No.: 17/334,678

(22) Filed: May 28, 2021

(65) Prior Publication Data
US 2021/0287379 A1 Sep. 16, 2021

Related U.S. Application Data

(63) Continuation of application No. PCT/CN2020/084112, filed on Apr. 10, 2020.

(30) Foreign Application Priority Data

Apr. 30, 2019 (CN) .......................... 201910358569.8

(51) Int. Cl.
G06T 7/20 (2017.01)
G06T 5/50 (2006.01)

(52) U.S. Cl.
CPC .................. G06T 7/20 (2013.01); G06T 5/50 (2013.01); G06T 2207/10016 (2013.01); G06T 2207/30241 (2013.01)

(58) Field of Classification Search
CPC ... G06T 7/20; G06T 5/50; G06T 2207/10016; G06T 2207/30241; G06T 2207/20101;
(Continued)

(56) References Cited

U.S. PATENT DOCUMENTS 10,956,747 B2 * 3/2021 Barzelay ............... G06F 3/0484
2011/0141287 A1 * 6/2011 Dunkel ..................... G06T 7/20
348/169
(Continued)

FOREIGN PATENT DOCUMENTS

CN 101930779 A * 12/2010
CN 101930779 A 12/2010
(Continued)

OTHER PUBLICATIONS

The World Intellectual Property Organization (WIPO) International Search Report for PCT/CN2020/084112 dated Jul. 9, 2020 7 Pages (including translation).

(Continued)

Primary Examiner — Matthew C Bella
Assistant Examiner — Pardis Sohraby
(74) Attorney, Agent, or Firm — ANOVA LAW GROUP, PLLC

(57) ABSTRACT

Embodiments of this application disclose a video data processing method and apparatus, and a storage medium. The method includes determining, in response to a trigger operation on a target video, a target pixel in a key video frame, and obtaining multimedia information associated with the target pixel, the key video frame being a video frame in which the trigger operation is located, and the target pixel corresponding to the trigger operation in the key video frame; identifying a trajectory obtaining request corresponding to the target pixel based on location information of the target pixel; obtaining target trajectory information associated with the location information of the target pixel, the target trajectory information comprising location information of the target pixel in a next video frame following the key video frame; and displaying the multimedia information
(Continued)

based on the location information of the target pixel in the next video frame.

18 Claims, 13 Drawing Sheets

(58) Field of Classification Search
CPC ........... G06T 13/80; G06T 2207/30196; G06T 7/246; G06T 11/60; H04N 21/4312; H04N 21/44008; H04N 21/4884; H04N 21/2387; H04N 21/47217; H04N 21/8455; H04N 21/8547
USPC ........................................................ 382/100
See application file for complete search history.

(56) References Cited

U.S. PATENT DOCUMENTS

| | | | |
|---|---|---|---|
| 2014/0196082 A1* | 7/2014 | Maruyama ......... | H04N 21/4788 725/32 |
| 2014/0241573 A1 | 8/2014 | Goel et al. | |
| 2016/0309239 A1 | 10/2016 | Maruyama et al. | |
| 2018/0082428 A1* | 3/2018 | Leung ....................... | G06T 7/11 |
| 2019/0096439 A1* | 3/2019 | Brouwer .......... | H04N 21/44008 |
| 2019/0253747 A1 | 8/2019 | Ramaswamy et al. | |
| 2019/0392591 A1* | 12/2019 | Lee .......................... | G01V 8/10 |
| 2020/0380702 A1 | 12/2020 | He et al. | |
| 2021/0012511 A1 | 1/2021 | Zhang et al. | |

FOREIGN PATENT DOCUMENTS

| | | | | |
|---|---|---|---|---|
| CN | 104881640 A | | 9/2015 | |
| CN | 105872442 A | | 8/2016 | |
| CN | 108242062 A | | 7/2018 | |
| CN | 108389217 A | * | 8/2018 | |
| CN | 109087335 A | | 12/2018 | |
| CN | 109558505 A | | 4/2019 | |
| CN | 110062272 A | | 7/2019 | |
| WO | 20140013690 A1 | | 1/2014 | |
| WO | 2018017936 A1 | | 1/2018 | |
| WO | 2018105290 A1 | | 6/2018 | |
| WO | WO-2019033541 A1 | * | 2/2019 | ......... G06K 9/00295 |
| WO | WO-2019057197 A1 | * | 3/2019 | ............. G06T 7/246 |

OTHER PUBLICATIONS

The State Intellectual Property Office of the People's Republic of China (SIPO) Office Action 1 for for 201910358569.8 dated Nov. 4, 2020 9 Pages (including translation).
The European Patent Office (EPO) The partial supplementary European Search Report for 20799151.4 dated Jun. 10, 2022 17 pages.
The Japan Patent Office (JPO) Notification of Reasons for Refusal for Application No. 2021-531593 dated Jul. 19, 2022 6 pages (including translation).

* cited by examiner

VIDEO DATA PROCESSING METHOD AND RELATED APPARATUS

RELATED APPLICATIONS

This application is a continuation of PCT Application No. PCT/CN2020/084112, entitled "VIDEO DATA PROCESSING METHOD AND RELATED DEVICE" and filed on Apr. 10, 2020, which claims priority to Chinese Patent Application No. 201910358569.8, entitled "VIDEO DATA PROCESSING METHOD AND RELATED APPARATUS" and filed on Apr. 30, 2019. The two applications are both incorporated herein by reference in their entirety.

FIELD OF THE TECHNOLOGY

This application relates to the field of Internet technologies, and in particular, to a video data processing method and related apparatus.

BACKGROUND OF THE DISCLOSURE

When watching a network video using a user terminal, a user may watch user texts or user comments posted by the user or other users on a video playing interface. Often, the user text outputted to the video playing interface is outputted and displayed by using a fixed text display track in the video playing interface.

SUMMARY

Embodiments of this application provide a video data processing method and related apparatus.

One aspect of the embodiments of the present application provides a video data processing method, including: determining, in response to a trigger operation on a target video, a target pixel in a key video frame of the target video, and obtaining multimedia information associated with the target pixel, the key video frame being a video frame in which the trigger operation is located, and the target pixel being a pixel corresponding to the trigger operation in the key video frame; identifying a trajectory obtaining request corresponding to the target pixel based on location information of the target pixel in the key video frame; obtaining, based on the trajectory obtaining request, target trajectory information associated with the location information of the target pixel in the key video frame, the target trajectory information comprising location information of the target pixel in a next video frame following the key video frame, the location information of the target pixel in the next video frame being obtained by tracking the target pixel; and displaying, when the next video frame following the key video frame is played, the multimedia information based on the location information of the target pixel in the next video frame following the key video frame in the target trajectory information.

Another aspect of the embodiments of the present application provides a video data processing method, including obtaining a first video frame and a second video frame adjacent to the first video from a target video; determining an average displacement matrix corresponding to the first video frame based on an optical flow tracking rule corresponding to the target video, pixels in the first video frame, and pixels in the second video frame; tracking location information of the pixels in the first video frame based on the average displacement matrix, and determining location information of pixels being tracked in the second video frame; and generating, based on the location information of the pixels in the first video frame and the location information of the pixels being tracked in the second video frame, trajectory information associated with the target video, the trajectory information comprising target trajectory information used for tracking and displaying multimedia information associated with a target pixel in the target video.

An aspect of the embodiments of this application provides a computer device, including: a processor, a memory, and a network interface, the processor being connected to the memory and the network interface, the network interface being configured to provide a data communication function, the memory being configured to store a computer program, the processor being configured to invoke the computer program to perform the method according to the one aspect of the embodiments of this application.

Another aspect of the embodiments of the present application provides a non-transitory computer storage medium, storing a computer program, the computer program including program instructions, the program instructions, when executed by a processor, performing the method according to the one aspect of the embodiments of this application.

BRIEF DESCRIPTION OF THE DRAWINGS

To describe the technical solutions of the embodiments of this application more clearly, the following briefly introduces the accompanying drawings required for describing the embodiments of the present application. The accompanying drawings in the following description show only some embodiments of this application, and a person of ordinary skill in the art may derive other drawings from these accompanying drawings without creative efforts.

DESCRIPTION OF EMBODIMENTS

The technical solutions in the embodiments of this application are clearly described in the following with reference to the accompanying drawings. Apparently, the embodiments to be described are merely a part rather than all of the embodiments of this application. All other embodiments obtained by a person of ordinary skill in the art based on the embodiments of this application without creative efforts shall fall within the protection scope of this application.

During streaming of an existing online video, a user text displayed in a video playing interface is independent of video content played on the video playing interface, resulting in that the displayed user text lacks a correlation with the video content. In addition, when a user needs to send the user text, a user terminal outputs the acquired user text by using a predetermined text display track. Therefore, the user text sent by each user is outputted by using the same text display track, resulting in that it is impossible to comment on the video content in a targeted manner.

Figure 1:
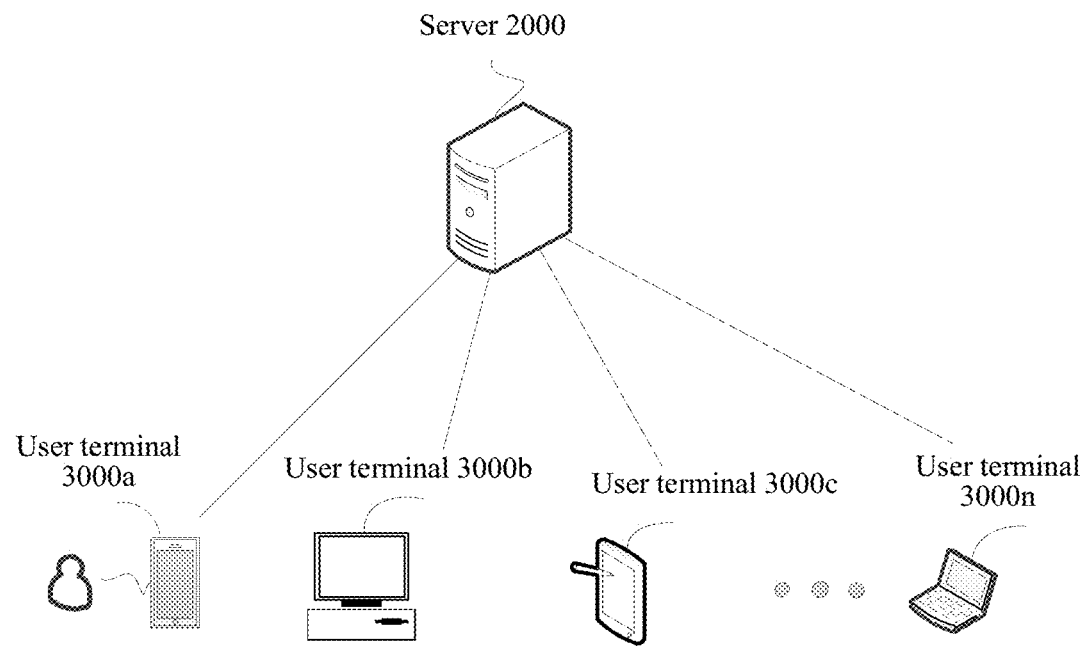
FIG. 1 is a schematic structural diagram of a network architecture according to an embodiment of this application.

FIG. 1 is a schematic structural diagram of a network architecture according to an embodiment of this application. As shown in FIG. 1, the network architecture may include a server 2000 (or an application server 2000) and a user terminal cluster. The server 2000 may be a server cluster formed by a large quantity of servers, for example, a cloud server, or a cloud for short. The user terminal cluster may include a plurality of user terminals, and as shown in FIG. 1, may specifically include a user terminal 3000a, a user terminal 3000b, a user terminal 3000c, . . . , and a user terminal 3000n. As shown in FIG. 1, the user terminal 3000a, the user terminal 3000b, the user terminal 3000c, . . . , and the user terminal 3000n may each establish a network connection to the server 2000, so that each user terminal can exchange data with the server 2000 through the network connection.

As shown in FIG. 1, each user terminal in the user terminal cluster may each be installed with a target application in an integrated manner. When running in the user terminals, the target application may exchange data with the server 2000 shown in FIG. 1 respectively. The target application may include an application with a video playing function such as a multimedia application, a social networking application, or an entertainment application. For ease of understanding, in this embodiment of the present application, for example, one of the plurality of user terminals is used as a target user terminal, and a specific process in which the target user terminal integrated with the target application exchanges data with the server 2000 by using a service data display platform is described. In this embodiment of the present application, the target user terminal may include a mobile terminal integrated with the target application such as a personal computer, a tablet computer, a notebook computer, or a smartphone. The server 2000 may be a backend server of the target application, a service database corresponding to the backend server may be configured for storing each piece of service data information displayed on the service data display platform, and the service data information may include Internet information such as video data. It is to be understood that a plurality of videos may be displayed on the service data display platform, when triggering one of the plurality of videos in the target user terminal by using the service data display platform, a target user may obtain video data corresponding to the video, and the video data may be played in the target user terminal. In addition, video data currently played in the target user terminal may further be referred to as a target video. The target video is video data returned by the server 2000 based on a data loading instruction sent by the target user terminal.

The target video may include a plurality of video frames, each video frame may be referred to as image data, and each video frame corresponds to a playing timestamp (that is, a moment) in playing duration of the target video, so that when loading and playing the target video, the target user terminal may display a corresponding video frame in a playing display interface based on a playing timestamp corresponding to each video frame in the target video.

Figure 2:
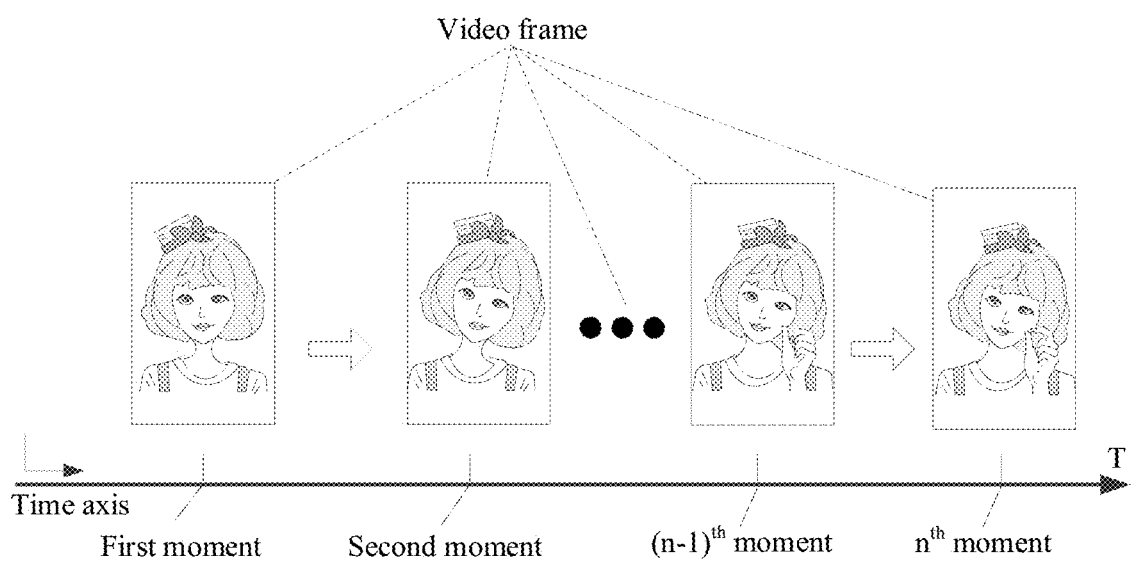
FIG. 2 is a schematic diagram of a plurality of video frames in a target video according to an embodiment of this application.

The server 2000 may perform a framing processing on each video in a video set stored in the service database at a video preprocessing stage, to split a plurality of video frames included in each video into pictures. For ease of understanding, further, FIG. 2 is a schematic diagram of a plurality of video frames in a target video according to an embodiment of this application. The target video may be a video A in the service database. As shown in FIG. 2, the video A may include n video frames, n being a positive integer greater than 0. The server 2000 may pre-split the n video frames in the video A into n pictures. Every two adjacent pictures in the n pictures may be referred to as an image pair. For example, as shown in FIG. 2, in this embodiment of the present application, a video frame corresponding to a first moment shown in FIG. 2 and a video frame corresponding to a second moment may be referred to as an image pair, the video frame corresponding to the second moment and a video frame corresponding to a third moment may be referred to as an image pair, . . . , and the video frame corresponding to the $(n-1)^{th}$ moment and a video frame corresponding to an $n^{th}$ moment may be referred to as a first image pair. In other words, for a target video, a plurality of image pairs may be determined from a plurality of video frames of the target video, and each image pair may include video frames corresponding to two adjacent moments, that is, each image pair may include two adjacent video frames.

For ease of understanding, in this embodiment of the present application, a first image pair in the plurality of image pairs is used as an example. At a video preprocessing stage, in this embodiment of the present application, one video frame (for example, the video frame corresponding to the first moment shown in FIG. 2) in the first image pair may be referred to as a first video frame, and the other video frame (that is, the video frame corresponding to the second moment) in the image pair may be referred to as a second video frame. Location information of all pixels in the first video frame in the image pair may be tracked based on an optical flow tracking rule, to obtain location information of each pixel in the first video frame appearing in the second video frame. Because each image pair includes two adjacent video frames, location information of pixels in a first video frame in each image pair that appear in a next video frame may be obtained through calculation. Finally, motion trajectories of all pixels in the video A in all video frames may be determined in the server 2000, and the motion trajectories of the pixels may be collectively referred to as trajectory information of the pixels.

The server 2000 may pre-calculate the trajectory information of all the pixels in the video A. Therefore, when the target user plays the video A in the target user terminal, the currently played video A may be referred to as a target video. During playing of the target video, if the target user needs to track an object, the target user may perform a trigger operation on the object (that is, a target object) that needs to be tracked in the target user terminal. A pixel corresponding to the trigger operation is referred to as a target pixel, that is, the target pixel is determined by the trigger operation performed by the target user on the target object in the currently played video frame, and the trigger operation may be used for selecting, in the currently played video frame, a target object that needs to be tracked. In this embodiment of the present application, a video frame corresponding to the trigger operation may be referred to as a key video frame. In other words, in this embodiment of the present application, a video frame currently including the target pixel may be referred to as a key video frame in the target video. It may be understood that the key video frame may be the video frame corresponding to the first moment in the foregoing embodiment corresponding to FIG. 2. In some embodiments, the key video frame may be alternatively the video frame corresponding to the second moment in the foregoing embodiment corresponding to FIG. 2. This is not listed one by one herein.

It is to be understood that in this embodiment of the present application, the key video frame, a target pixel in the key video frame, and location information of the target pixel may be sent to the server 2000 in the foregoing embodiment corresponding to FIG. 1, so that the server 2000 may screen, based on the location information of the target pixel in the key video frame, pre-calculated trajectory information of all pixels in the target video to obtain trajectory information matching the location information of the target pixel as target trajectory information. The target trajectory information may include location coordinates of the target pixel in video frames after the key video frame. Further, the server 2000 may return the target trajectory information to the target user terminal, so that when playing a next video frame following the key video frame, the target user terminal may further determine location information of the target pixel in the next video frame following the key video frame according to the target trajectory information, that is, may obtain target location information of the target pixel, and display multimedia information corresponding to the target object based on the target location information.

Figure 3:
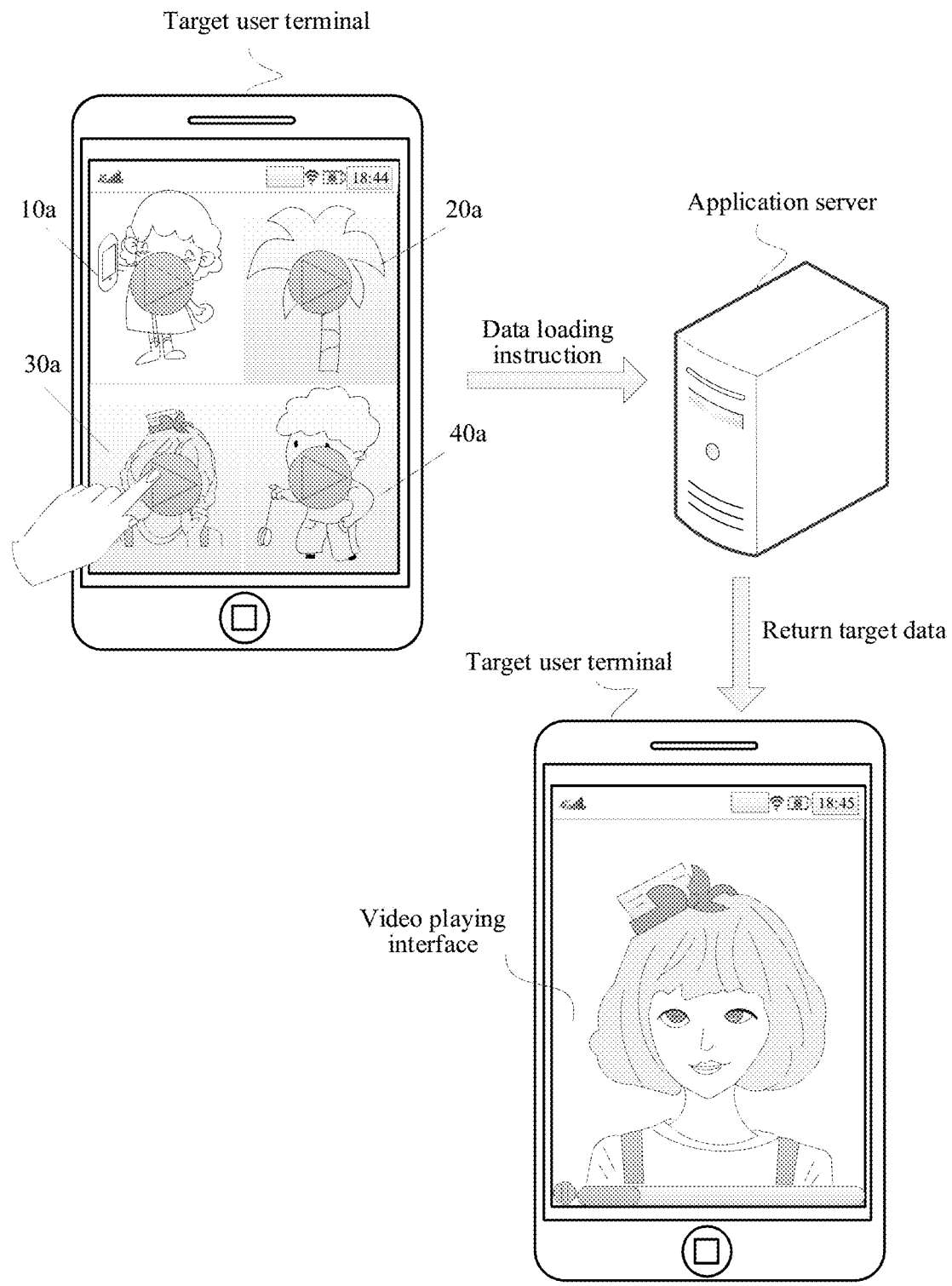
FIG. 3 is a schematic scenario diagram of obtaining a target video according to an embodiment of this application.

Further, FIG. 3 is a schematic scenario diagram of obtaining a target video according to an embodiment of this application. As shown in FIG. 3, the target user terminal may be the user terminal 3000a in the foregoing embodiment corresponding to FIG. 1. As shown in FIG. 3, after the target user enters the target application, a service data display platform of the target application may be displayed in the target user terminal (for example, a smartphone), and the service data display platform may display a video 10a, a video 20a, a video 30a, and a video 40a shown in FIG. 3. When the target user needs to play the video 30a (the video 30a may be the video A in the foregoing embodiment corresponding to FIG. 3) shown in FIG. 3 in the target user terminal, the target user may perform a playing operation on a region in which the video 30a is located (for example, the target user may perform a click operation on the video 30a), and add target identification information corresponding to the video 30a into a data loading instruction shown in FIG. 3, so that the data loading instruction is further sent to an application server having a network connection relationship with the target user terminal. The application server may be the server 2000 in the foregoing embodiment corresponding to FIG. 1. It may be understood that when obtaining the data loading instruction, the application server may find video data corresponding to the target identification information from the service database, and the found video data may be collectively referred to as target data, so that the target data can be sent to a target user terminal shown in FIG. 3, and the target user terminal may play the video data in a video playing interface shown in FIG. 3. In this case, the target user terminal may refer to the played video 30a selected by the target user as a target video, that is, in this case, the target user terminal may play each video frame in the video 30a according to a playing timestamp shown in FIG. 3.

For a specific process in which the target user terminal obtains the target object and obtains the target trajectory information, reference may be made to implementations provided in the embodiments corresponding to FIG. 4 to FIG. 7. In addition, the server 2000 obtains location information of the pixels in the second video frame. For a specific process of selecting the target trajectory information corresponding to the target pixel, reference may be made to implementations provided in the embodiments corresponding to FIG. 8 to FIG. 10.

Figure 4:
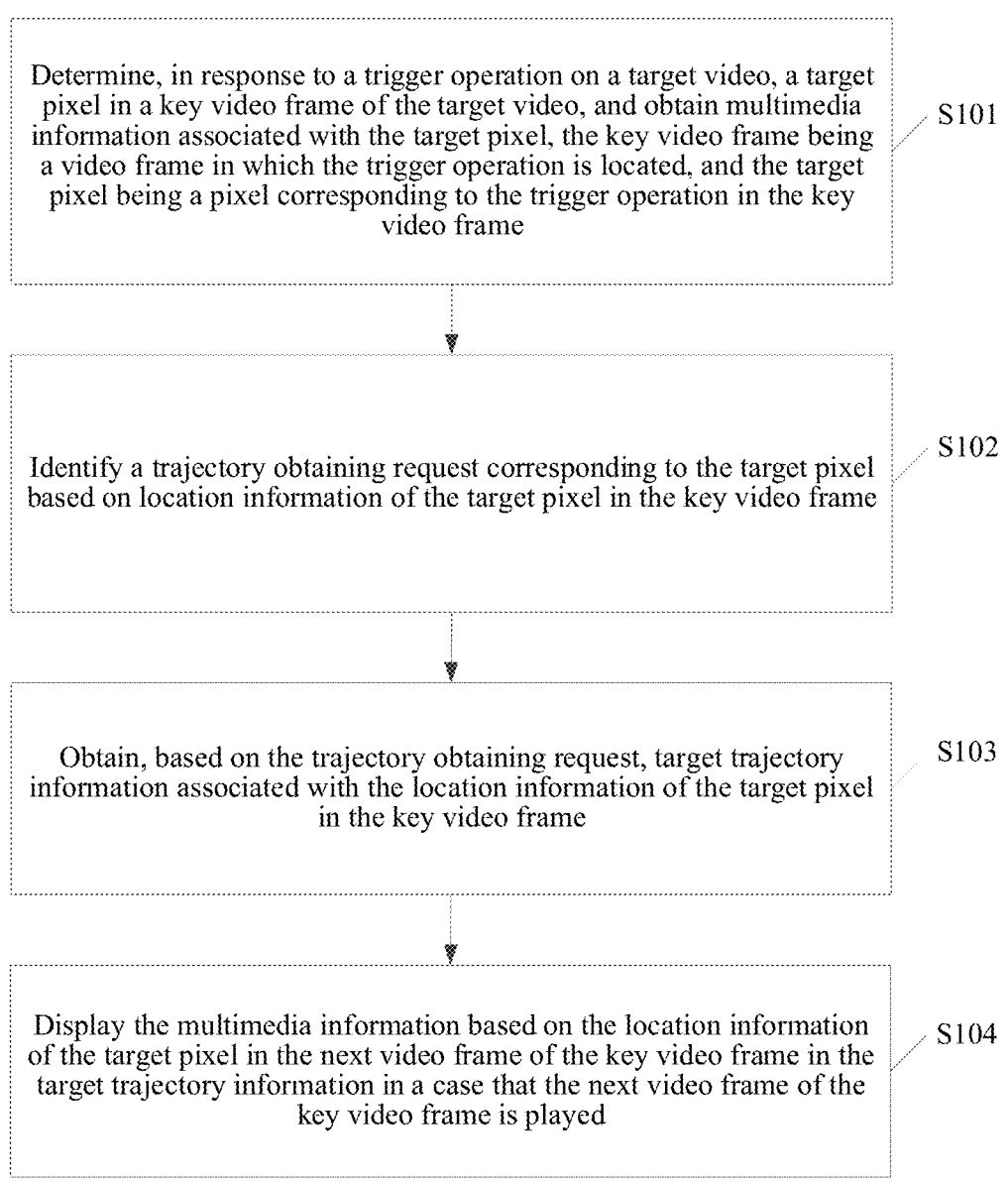
FIG. 4 is a schematic flowchart of a video data processing method according to an embodiment of this application.

FIG. 4 is a schematic flowchart of a video data processing method according to an embodiment of this application. As shown in FIG. 4, the method may be applicable to the target user terminal in the foregoing embodiment corresponding to FIG. 1 and may include the following steps.

Step S101. Determine, in response to a trigger operation on a target video, a target pixel in a key video frame of the target video, and obtain multimedia information associated with the target pixel, the key video frame being a video frame in which the trigger operation is located, and the target pixel being a pixel corresponding to the trigger operation in the key video frame.

Specifically, when accessing a target application, the target user terminal may display a service data display platform used for carrying a plurality of pieces of service data information on a display surface of the target application. For example, each piece of service data information on the service data display platform may be a video. The service data information displayed on the service data display platform may be determined after an application server having a network connection relationship with the target user terminal performs screening based on user profile data of a target user (for example, historical behavioral data of the target user). When the target user performs a playing operation on service data information (for example, a video) on the service data display platform, video data corresponding to the video may be loaded from a service database corresponding to the application server, and then the loaded video data may be played in a video playing interface of the target user terminal. Further, the target user terminal may obtain a trigger operation performed by the target user on a target object (that is, an object that needs to be tracked) in the video playing interface during playing of the video data. The trigger operation is, for example, clicking by using a mouse or touching a point in a target object in a video frame displayed on a display of the target user terminal. A video frame corresponding to the trigger operation may be referred to as a key video frame, and a pixel corresponding to the trigger operation in the key video frame is referred to as a target pixel. Pixels are points in an image (for example, a video frame). If an image is a picture with a resolution of 640*480, there are 640*480 pixels distributed on the picture. Generally, the pixels in the image have attributes of a spatial location and a color (or grayscale). Meanwhile, the target user terminal may alternatively create a text box in a child window independent of the video playing interface, so that the target user may input multimedia information having an association relationship with the target object in the text box. After the target user inputs the multimedia information in the text box, the target user terminal may obtain the multimedia information associated with the target object, that is, the multimedia information associated with the target object may be collectively referred to as a user text or a user comment inputted by the target user.

The target user terminal may be a terminal device having a video data playing function, or the target user terminal may be the user terminal 3000a in the foregoing embodiment corresponding to FIG. 1. The target user terminal may be understood as a mobile terminal. The application server may be the server 2000 in the foregoing embodiment corresponding to FIG. 1.

Figure 5:
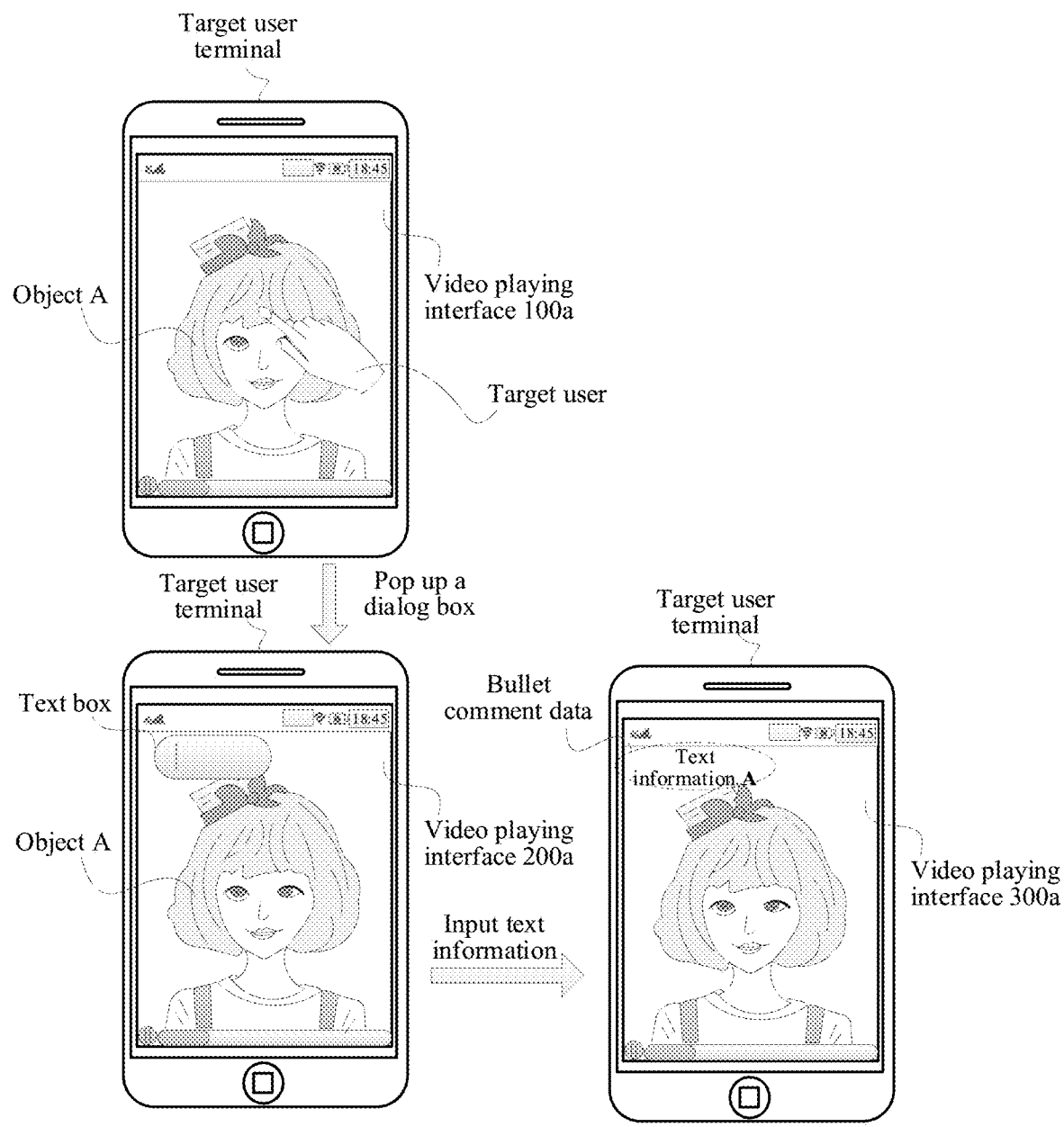
FIG. 5 is a schematic diagram of obtaining multimedia information according to an embodiment of this application.

For ease of understanding, further, FIG. 5 is a schematic diagram of obtaining multimedia information according to an embodiment of this application. As shown in FIG. 5, during playing of the video 30a in the foregoing embodiment corresponding to FIG. 3, the target user terminal may use the currently played video 30a as a target video. It may be understood that the target user may perform a trigger operation on a video frame of a plurality of video frames included in the video 30a at any moment when the video 30a is played. The target user terminal may use the video frame corresponding to the trigger operation as a key video frame. For example, as shown in FIG. 5, the target user may select an object A from a video playing interface 100a shown in FIG. 5 as a target object, and the target user terminal may refer to a video frame currently played in the video playing interface 100a as the key video frame. In other words, the target user terminal may use a video frame corresponding to the selection operation (that is, the trigger operation) as the key video frame, and use a pixel corresponding to the selection operation in the key video frame as a target pixel. In this case, the target pixel is a pixel in the key video frame in the target video obtained by the target user terminal.

As shown in FIG. 5, after the target user performs the trigger operation on the object A in the video playing interface 100a shown in FIG. 5, a text box shown in FIG. 5 may pop up in a video playing interface 200a shown in FIG. 5, and the text box may be alternatively referred to as a dialog box. As shown in FIG. 5, the text box may be understood as a floating window independent of the video playing interface 200a, and the text box shown in FIG. 5 may have an association relationship with the object A shown in FIG. 5 (for example, there may be a relative relationship in a display location with a target pixel in the object A, to construct a correlation between the target pixel of the target object in the video 30a and multimedia information associated with the target object). The implementation of the floating window may be similar or the same as that of the video playing interface. It is to be understood that in this embodiment of the present application, multimedia information inputted in the dialog box may include data such as a user text, a user picture, and a user expression, and the user text (that is, text information), the user picture (that is, picture information), and the user expression (that is, expression information) inputted by the target user in the dialog box may be collectively referred to as bullet comment data. The display of the bullet comment data may be similar to a subtitle.

Therefore, after the target user inputs text information A in the text box in the video playing interface 200a shown in FIG. 5, the inputted text information A may be displayed in a video playing interface 300a shown in FIG. 5. The inputted text information A may be text information shown in FIG. 5 having a location spacing distance with the target pixel in the object A. The text information A displayed in the video playing interface 300a may be referred to as bullet comment data associated with the target object.

Step S102. Determine a trajectory obtaining request corresponding to the target pixel based on location information of the target pixel in the key video frame.

Specifically, the target user terminal may determine location information of the target pixel in the key video frame, and generate a trajectory obtaining request corresponding to the target pixel based on a frame number of the key video frame in the target video and the location information of the target pixel in the key video frame, so that step S103 may be further performed.

The trajectory obtaining request may be used for instructing the application server to screen pre-calculated trajectory information corresponding to all pixels in the target video to obtain trajectory information matching the target pixel.

Step S103. Obtain, based on the trajectory obtaining request, target trajectory information associated with the location information of the target pixel in the key video frame.

The target trajectory information includes location information of the target pixel in a next video frame following the key video frame, and the location information of the target pixel in the next video frame following the key video frame is obtained by tracking the target pixel.

In this embodiment of the present application, the target user terminal may screen, based on motion trajectories (a motion trajectory of each pixel may be collectively referred to as trajectory information) of all pixels in all video frames in the target video pre-calculated by the application server, the motion trajectories corresponding to the pixels to obtain a motion trajectory of a pixel matching the target pixel as the target trajectory information associated with the location information of the target pixel in the key video frame. In other words, when obtaining the target trajectory information, the target user terminal may quickly determine, based on location information of the target pixel in a next video frame following the key video frame included in the target trajectory information, a location spacing distance between the target pixel in the target object in the foregoing embodiment corresponding to FIG. 5 and the multimedia information associated with the target object, or a location spacing between the target pixel and the multimedia information, that is, location information of the multimedia information appearing in the next video frame following the key video frame may be quickly obtained.

It may be understood that, the location spacing distance may be understood as a relative location spacing distance between the target pixel in the key video frame and corresponding bullet comment data. That is, the location spacing distance may include a relative location spacing distance in a horizontal (that is, transverse) direction, or may include a relative location spacing distance in a vertical (that is, longitudinal) direction. Therefore, it may be ensured that when obtaining the location information of the target pixel in the next video frame following the key video frame, the target user terminal may quickly obtain location information of the text information A in the next video frame following the key video frame through calculation based on the relative location spacing distance. That is, in this case, the location information of the text information A displayed in the video playing interface 300a in the foregoing embodiment corresponding to FIG. 5 depends on location information of the target pixel in another video frame after the key video frame. When the calculation performance of the target user terminal is relatively general, the target user terminal may obtain trajectory information meeting the location information of the target pixel in the key video frame as the target trajectory information from an application server having a network connection relationship with the target user terminal, so that the target user terminal can further quickly and accurately track the bullet comment data in effective duration based on location information of the target pixel in the target trajectory information appearing in a next video frame following the key video frame when obtaining the target trajectory information of the target pixel pre-calculated by the application server. Therefore, a calculation amount of the target user terminal can be effectively reduced, to ensure that the bullet comment data can also be quickly tracked in the case that the calculation performance of the target user terminal is relatively general.

The effective duration may be display duration corresponding to bullet comment data, that is, the target user terminal may track bullet comment data associated with the target object in the display duration.

It is to be understood that the motion trajectory of each pixel (that is trajectory information of each pixel) in the target video is determined by location information of each pixel in each video frame of the target video. For the target video including a plurality of video frames, in this embodiment of the present application, any two adjacent video frames in the plurality of video frames may be determined as an image pair. It is to be understood that one of two video frames included in each image pair determined from the plurality of video frames may be referred to as a first video frame and the other video frame may be referred to as a second video frame. For an image pair 1 formed by the video frame corresponding to the first moment and the video frame corresponding to the second moment in the foregoing embodiment corresponding to FIG. 2, the video frame corresponding to the first moment in the image pair 1 may be referred to as a first video frame, and the video frame corresponding to the second moment may be referred to as a second video frame. Further, all pixels in the first video frame may be tracked based on a pre-calculated average displacement matrix between the two video frames in the image pair 1, to determine location information of all the pixels in the first video frame appearing in the second video frame. Similarly, for an image pair 2 formed by the video frame corresponding to the second moment and the video frame corresponding to the third moment in the foregoing embodiment corresponding to FIG. 2, the video frame corresponding to the second moment may be alternatively referred to as a first video frame, and the video frame corresponding to the third moment may be referred to as a second video frame. Further, all pixels in the first video frame may be tracked based on a pre-calculated average displacement matrix between the two video frames in the image pair 2, to determine location information of all the pixels in the first video frame appearing in the second video frame. By analogy, in this embodiment of the present application, an average displacement matrix corresponding to each image pair may be obtained, the average displacement matrix corresponding to the each image pair may be referred to as an average displacement matrix corresponding to a first video frame in the each image pair, and an average displacement matrix corresponding to each first video frame may be used for mapping all pixels in a first video frame to a second video frame, to accurately obtain location information of the pixels obtained through the mapping in the second video frame. It is to be understood that in this embodiment of the present application, the average displacement matrix may include a longitudinal average displacement matrix and a transverse average displacement matrix. Longitudinal coordinate transformation may be performed on a first longitudinal coordinate value (for example, a y value) of each pixel in the first video frame by using the longitudinal average displacement matrix, to obtain a second longitudinal coordinate of a corresponding pixel mapped to the second video frame. Similarly, transverse coordinate transformation may be performed on a first transverse coordinate value (for example, an x value) of each pixel in the first video frame by using the transverse average displacement matrix, to obtain a second transverse coordinate of a corresponding pixel mapped to the second video frame. It is to be understood that in this embodiment of the present application, the first transverse coordinate value and the first longitudinal coordinate value of each pixel in the first video frame may be referred to as first location information of each pixel in the first video frame, and the second transverse coordinate and the second longitudinal coordinate of each pixel mapped to the second video frame may be referred to as second location information of each pixel obtained through the mapping in the second video frame. Because each image pair corresponds to an average displacement matrix, corresponding second location information may be obtained through calculation based on first location information of pixels in a first video frame, the calculated second location information of each pixel obtained through mapping in each second video frame may be retained, and location information of the same pixel in each video frame may be integrated, to obtain motion trajectories of all pixels in the video frame, thereby tracking all pixels in all video frames of the target video.

It is to be understood that a plurality of video frames in the target video displayed in the foregoing embodiment corresponding to FIG. 2 may be a plurality of consecutive image frames. Therefore, after the target video shown in FIG. 2 is split, a corresponding video frame number may be set for each split image frame (that is, a video frame) according to a playing sequence. For example, a video frame number of a video frame obtained at the first moment may be 1, and the video frame number 1 may be used for representing that the video frame obtained at the first moment is a first frame in the target video. Similarly, a video frame number of a video frame obtained at the second moment may be 2, and the video frame number 2 may be used for representing that the video frame obtained at the second moment is a second frame in the target video. By analogy, a video frame number of a video frame obtained at the $(n-1)^{th}$ moment may be n-1, and the video frame number n-1 may be used for representing that the video frame obtained at the $(n-1)^{th}$ moment is a $(n-1)^{th}$ frame in the target video; and a video frame number of a video frame obtained at the $n^{th}$ moment may be n, and the video frame number n may be used for representing that the video frame obtained at the nth moment is an $n^{th}$ frame in the target video, that is, a lastest frame in the target video.

Figure 6:
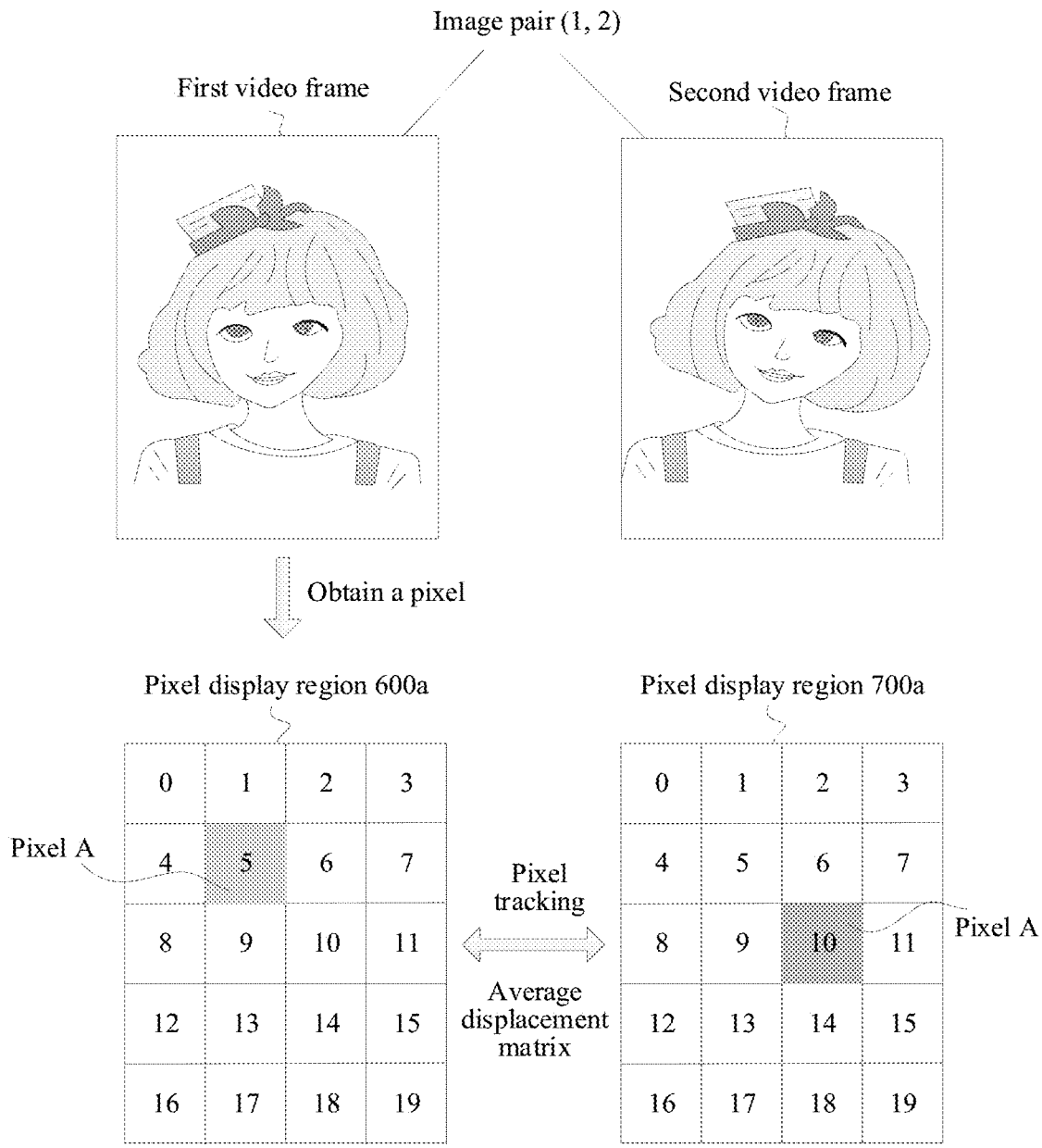
FIG. 6 is a schematic diagram of full-image pixel tracking according to an embodiment of this application.

For ease of understanding, in this embodiment of the present application, an image pair formed by the first frame and the second frame of the plurality of video frames shown in FIG. 2 may be referred to as a first image pair, to describe a specific process in which pixels in the first frame are transformed into the second frame in a translation manner by using the average displacement matrix to implement pixel tracking. The first frame in the first image pair is the video frame corresponding to the first moment in the foregoing embodiment corresponding to FIG. 2, and the second frame in the first image pair is the video frame corresponding to the second moment in the foregoing embodiment corresponding to FIG. 2. Further, FIG. 6 is a schematic diagram of full-image pixel tracking according to an embodiment of this application. As shown in FIG. 6, an image pair (1, 2) may be the first image pair. A first video frame in the first image pair may be the video frame (that is, the first frame) corresponding to the first moment, and a second video frame in the first image pair may be the video frame (that is, the second frame) corresponding to the second moment. It is to be understood that a value 1 in the image pair (1, 2) is the video frame number of the first frame, and a value 2 is the video frame number of the second frame. Therefore, a video frame number of each video frame in the target video may be used for representing any two adjacent video frames in the target video. As shown in FIG. 6, a pixel display region 600a may include all pixels extracted from the first video frame of the image pair. For example, each pixel in the pixel display region 600a may correspond to a region identifier. The pixel display region 600a in FIG. 6 is only an example, and the pixel display region 600a may be alternatively referred to as a pixel region, or the like. It is to be understood that in this embodiment of the present application, for example, the pixels obtained from the first video frame are 20 pixels, and in the actual situation, a quantity of pixels obtained from the first video frame is far more than 20 listed in this embodiment of the present application. It is to be understood that because a plurality of video frames in the same video are obtained after the same terminal performs image acquisition, a quantity of pixels in each video frame included in the same video is the same.

As shown in FIG. 6, after each pixel in the first video frame is obtained, all the obtained pixels may be collectively referred to as pixels. All pixels in the pixel display region 600a may be tracked by using an average displacement matrix shown in FIG. 6, and location information of mapped pixels may be determined in a pixel display region 700a corresponding to the second video frame. For example, for a pixel A shown in FIG. 6, location information of the pixel A in the pixel display area 600a shown in FIG. 6 may be coordinate location information of a region identifier 5, the pixel A may be mapped to the pixel display region 700a shown in FIG. 6 by using the average displacement matrix, and location information of the pixel A in the pixel display region 700a shown in FIG. 6 may be coordinate location information of a region identifier 10. In this embodiment of the present application, after the location information of the pixel A in the second video frame is obtained through calculation, the location information may be stored. Because each image pair in the target video may correspond to an average displacement matrix, location information of each pixel in the first video frame mapped to the second video frame may be calculated. Location information of the same pixel in each image pair appearing in consecutive video frames may be integrated, to obtain location information of the pixel A appearing in each video frame in the target video, and a motion trajectory of the pixel A may be obtained based on the location information of the pixel A in each video frame in the target video.

Similarly, for other pixels in all pixels in the video frame, location information of each pixel in the other pixels in each video frame of the target video may be alternatively determined by using an average displacement matrix corresponding to each image pair (that is, an average displacement matrix corresponding to a first video frame in the each image pair), and motion trajectories of the other pixels may be obtained, to implement full-image pixel tracking of all pixels in the first video frame in the each image pair and obtain location information of all pixels of the target video in each video frame. It is to be understood that in this embodiment of the present application, trajectory information corresponding to all pixels in the target video may be collectively referred to as trajectory information corresponding to pixels.

If the calculation performance of the target user terminal cannot meet a calculation requirement for tracking a large quantity of pixels, to reduce a calculation amount of the target user terminal, the motion trajectories of all the pixels in the target video may be pre-calculated by using an application server having a network connection relationship with the target user terminal. Therefore, when the target user terminal actually plays the target video, the application server may receive location information of a target pixel sent by the target user terminal in a key video frame, screen the pre-calculated trajectory information corresponding to the pixels, to obtain trajectory information matching the target pixel as target trajectory information, and return the target trajectory information to the target user terminal, so that the target user terminal may further perform step S104 based on the obtained target trajectory information. The target pixel is a pixel selected by a target user in the key video frame.

In some embodiments, if the target user terminal has good calculation performance, the motion trajectories of all the pixels in the target video may be pre-calculated in the target user terminal, so that when the target user terminal actually plays the target video, trajectory information corresponding to the pixels may be further screened based on a target pixel selected by a target user in a target object, to obtain trajectory information matching the target pixel as target trajectory information, so as to perform step S104.

Step S104. Display the multimedia information based on the location information of the target pixel in the next video frame following the key video frame in the target trajectory information when the next video frame following the key video frame is played.

Figure 7:
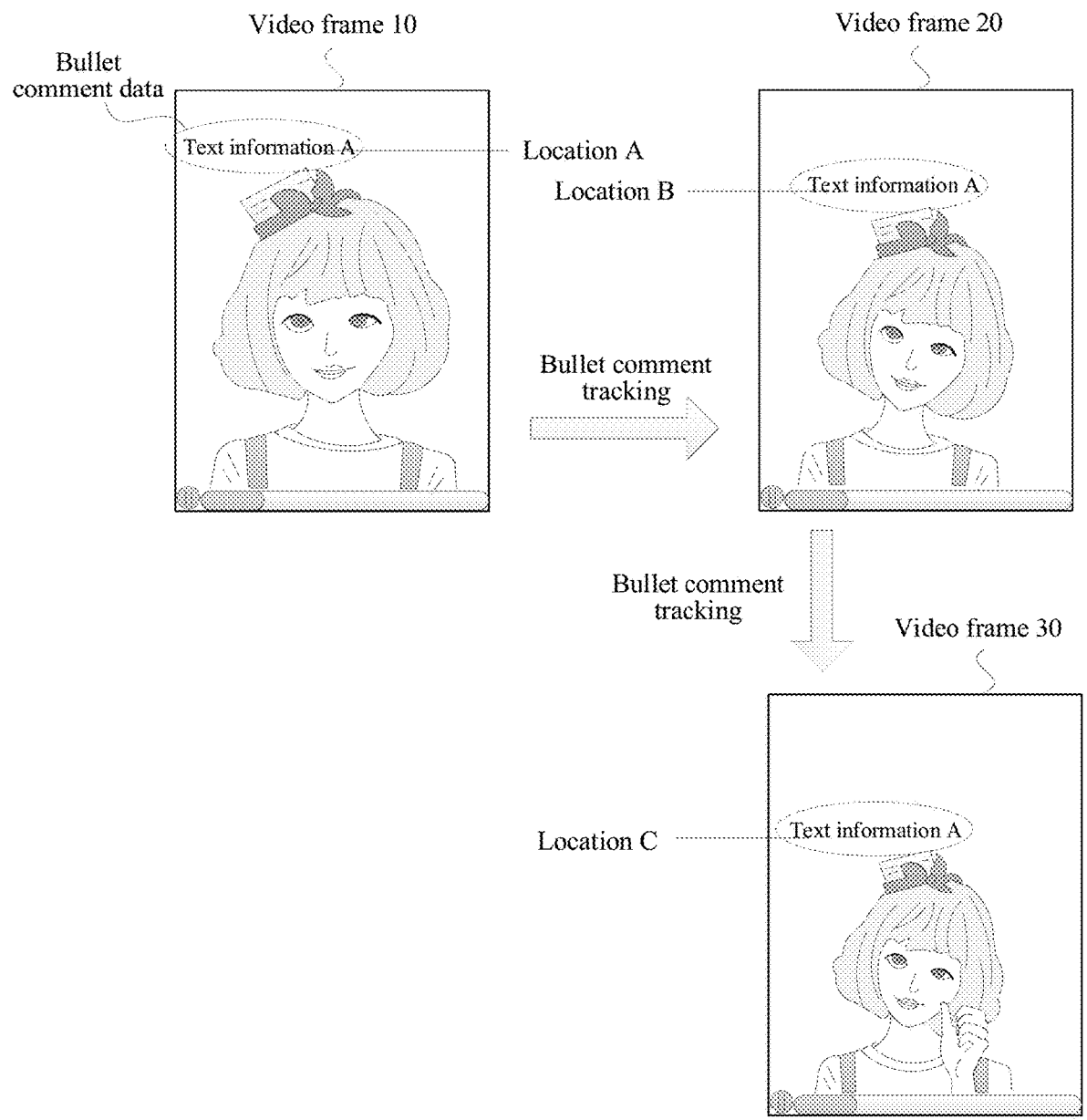
FIG. 7 is a schematic diagram of tracking bullet comment data in a plurality of consecutive video frames according to an embodiment of this application.

For ease of understanding, further, FIG. 7 is a schematic diagram of tracking bullet comment data in a plurality of consecutive video frames according to an embodiment of this application. It is to be understood that in this embodiment of the present application, a plurality of consecutive video frames for bullet comment tracking may include a currently played key video frame and unplayed video frames after the key video frame in the target video. For example, as shown in FIG. 7, when a video frame 10 is used as a key video frame, bullet comment tracking may be performed on bullet comment data appearing in the video frame 10 in each video frame (for example, a video frame 20 and a video frame 30) after the key video frame. The video frame 10 shown in FIG. 7 may be the video frame displayed in the video playing interface 300a in the foregoing embodiment corresponding to FIG. 5, that is, the video frame 10 shown in FIG. 7 may be a key video frame associated with the target user in a target video currently played in the target user terminal. In other words, in this embodiment of the present application, the key video frame may be understood as a video frame corresponding a trigger operation performed when the target user selects the target object. It is to be understood that in this embodiment of the present application, the target object may include an object such as a character, an animal, or a plant selected by the target user through a click operation in a currently played video frame. In other words, the target user terminal may refer to an object selected by the target user as a target object, may use a pixel corresponding to a trigger operation in the target object in the key video frame as a target pixel, and then may obtain trajectory information associated with the target pixel in the target object from trajectory information of all pixels in the target video pre-calculated by the application server, so that the obtained trajectory information may be used as target trajectory information corresponding to the target pixel. The target trajectory information may include location information of the target pixel in the key video frame, and may further include location information of the target pixel in each video frame (for example, a next video frame following the key video frame) after the key video frame. It is to be understood that location information of multimedia information (that is, the bullet comment data in the foregoing embodiment corresponding to FIG. 5) associated with the target object (also associated with the target pixel) in each video frame after the key video frame may be quickly obtained through calculation based on the location information of the target pixel in each video frame after the key video frame, to quickly track the bullet comment data associated with the target object, so that when the target user terminal plays a next video frame following the key video frame, the bullet comment data may be displayed in the next video frame in real time based on the location information of the bullet comment data in the key video frame obtained through calculation. The display of the bullet comment data may be similar to the display of a subtitle.

It is to be understood that in this embodiment of the present application, the bullet comment data is associated with the target object in the key video frame, accompany between the bullet comment data and the target object may be implemented, that is, a bullet comment inputted by the user may always follow a to-be-tracked target object for relative motion within valid tracking duration. For example, in the target video, if there is a target object in a plurality of consecutive video frames after the key video frame, bullet comment data (that is, the foregoing text information A) associated with the target object may be displayed based on location information of a target pixel in the target object in the consecutive video frames.

The target user terminal may alternatively transmit bullet comment data (multimedia information) inputted by a user and calculated location information of the bullet comment data in video frames of a target video to a server. Alternatively, a server may receive a frame number of a key video frame clicked by a user in a target video, coordinates of a target pixel, and inputted bullet comment data (multimedia information) that are sent by the target user terminal, calculate target trajectory information of the target pixel in video frames of the target video, calculate location information of the bullet comment data in the video frames of the target video based on the target trajectory information, and store the location information of the bullet comment data. When receiving information sent by the target user terminal, the server may alternatively receive information such as an identifier of the target user terminal and/or a user identifier of a user logging in to a target application on the target user terminal. Subsequently, when another user terminal plays the target video, the server may send the bullet comment data, the location information of the bullet comment data in the video frames of the target video, and the user identifier to another user terminal, and another user terminal displays the bullet comment data in the video frames of the target video according to the location information of the bullet comment data.

It is to be understood that for any video played in the target user terminal, when a current moment is a T1 moment, the target user may select an object that the target user thinks need to be tracked from a currently played video frame. The selected object may be referred to as a target object. Further, the target user terminal may select trajectory information associated with a target pixel in the target object based on pre-calculated trajectory information corresponding to all pixels in the video, to quickly obtain target trajectory information corresponding to the target pixel in the target object. It is to be understood that pre-calculated trajectory information corresponding to any one of each pixel in the video may be used for describing location information of the pixel in each video frame in the video. Therefore, when using a video frame played at the T1 moment as a key video frame, the target user terminal may obtain a target pixel in the target object in the key video frame, quickly obtain location information of the target pixel in each video frame after the key video frame from target trajectory information corresponding to the target pixel, and display multimedia information associated with the target object based on the target trajectory information. It may be understood that if trajectory information formed by the target pixel in each video frame is a circle, the multimedia information associated with the target object may synchronously follow the trajectory information in a circle. Therefore, all pixels in the target video are pre-tracked, trajectory information corresponding to each pixel may be pre-obtained, so that when the target video is played in the target user terminal, a pixel corresponding to a trigger operation in a target object may be used as a target pixel based on the trigger operation performed by a target user, to obtain trajectory information associated with the target pixel as target trajectory information, and multimedia information associated with the target object may be quickly and accurately tracked based on the obtained target trajectory information.

Accordingly, for different objects in the key video frame, motion trajectories corresponding to target pixels in the different objects may be obtained, so that bullet comment data associated with different target objects may move around different trajectories, and a correlation between the bullet comment data and an object targeted by the bullet comment data is stronger, thereby enriching a visual display effect of the bullet comment data and improving flexibility of a display manner of the bullet comment data.

In this embodiment of the present application, when a trigger operation of the target user on the target video is obtained, a video frame corresponding to the trigger operation in the target video may be used as a key video frame, so that a target pixel may be determined from the key video frame and multimedia information (for example, the multimedia information may be bullet comment data such as a user text, a picture, or an expression in the target video) associated with the target pixel and associated with a target object in which the target pixel is located may be obtained. Further, a trajectory obtaining request corresponding to the target pixel is determined based on the location information of the target pixel in the key video frame, and target trajectory information associated with the location information of the target pixel in the key video frame may be obtained based on the trajectory obtaining request, so that when a next video frame following the key video frame is played, bullet comment data associated with the target pixel and a target object in which the target pixel is located can be displayed based on the target trajectory information. In view of this, in this embodiment of the present application, when a key video frame is determined, trajectory information of all pixels in the key video frame may be screened to obtain trajectory information of a target pixel, and the obtained trajectory information of the target pixel is used as target trajectory information, thereby enriching a display effect of bullet comment data based on the obtained target trajectory information. For example, for target pixels in different target objects, obtained target trajectory information may be different, and the display effect of the bullet comment data is different. In addition, location information of bullet comment data in each video frame after the key video frame may be quickly determined based on an association relationship between a target object and the bullet comment data. In other words, the bullet comment data always changes with the target object in the target video, thereby enriching a visual display effect of a user text in a video and implementing a stronger correlation between bullet comment data and a target object or an object in a commented video.

Figure 8:
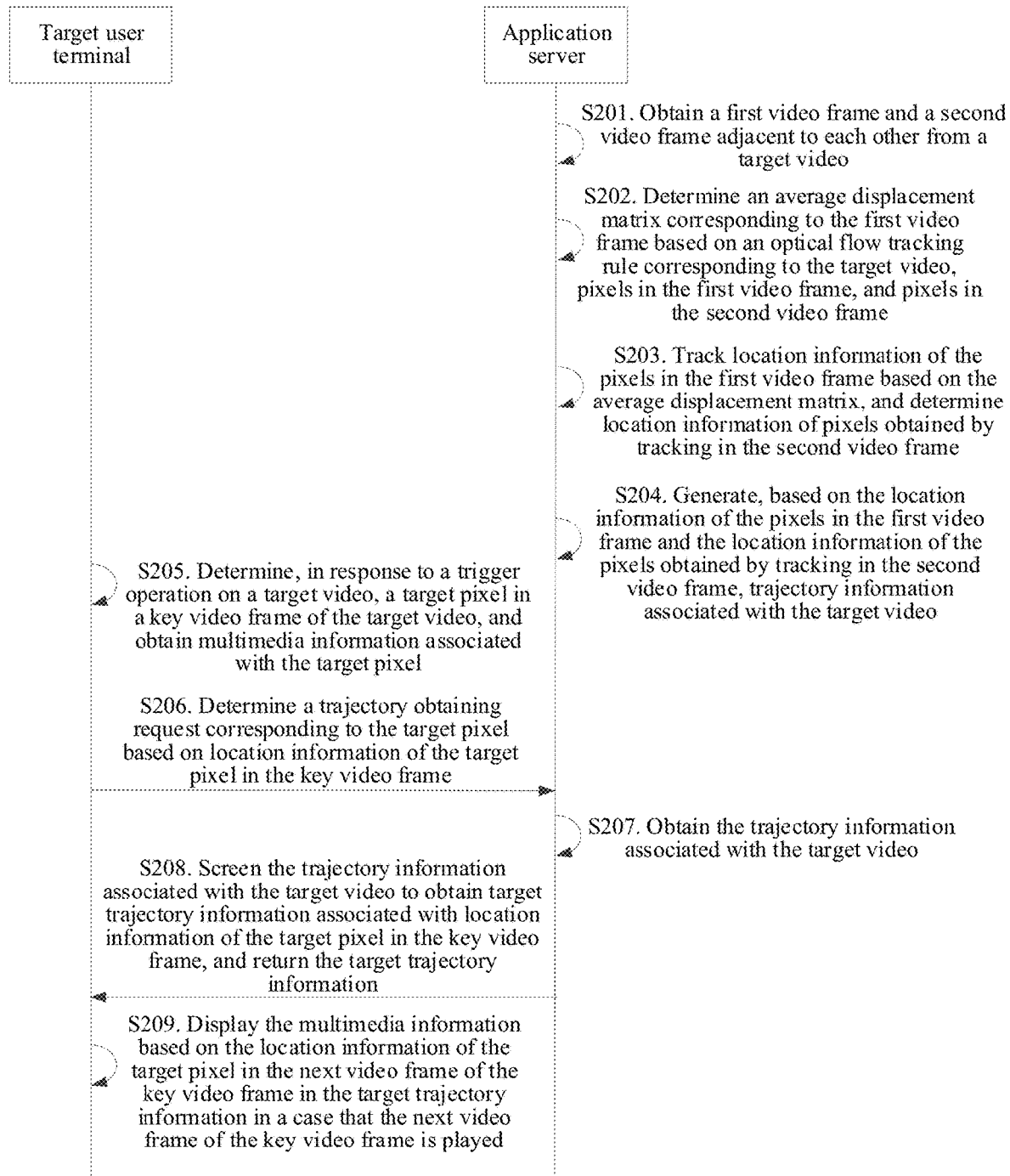
FIG. 8 is a schematic diagram of another video data processing method according to an embodiment of this application.

For ease of understanding, further, FIG. 8 is a schematic diagram of another video data processing method according to an embodiment of this application. The method is mainly used for describing a process of data exchange between a target user terminal and an application server, and may include the following steps.

Step S201. Obtain a first video frame and a second video frame adjacent to each other from a target video.

Specifically, the application server may determine a plurality of image pairs from a plurality of video frames included in a target video, and each of the plurality of image pairs is formed by two adjacent video frames in the target video.

In other words, the application server may first perform framing processing on the target video at a stage of performing video preprocessing on the target video, to split a plurality of video frames in the target video into pictures according to a playing time sequence, that is, the plurality of video frames arranged based on the playing time sequence shown in FIG. 2 may be obtained. Each video frame in the target video may be split, to obtain a picture corresponding to each video frame, that is, an image may be considered as an image frame. Further, the application server may perform pixel tracking on pixels in two video frames in each image pair by using a forward-backward optical flow method. For example, for a target video including n video frames, the application server may determine two video frames with adjacent frame numbers as an image pair according to a video frame number of each video frame in the target video. In other words, the application server may determine a video frame with a video frame number of 1 and a video frame with a video frame number of 2 as an image pair. Similarly, the application server may determine the video frame with the video frame number of 2 and a video frame with a video frame number of 3 as an image pair. By analogy, the application server may determine the video frame with the video frame number of n−1 and a video frame with the video frame number of n as an image pair.

For each image pair in the target video, two video frames in a corresponding image pair may be described by using a video frame number of each video frame. Therefore, for the target video including the n video frames, n−1 image pairs may be obtained, and the n−1 image pairs may be represented as (1, 2), (2, 3), (3, 4), . . . , and (n−1, n). The video frame with the video frame number of 1 in the image pairs may be referred to as a first frame of the target video, and the video frame with the video frame number of 2 may be referred to as a second frame of the target video. By analogy, the video frame with the video frame number of n−1 in the image pairs may be referred to as a $(n-1)^{th}$ frame of the target video, and the video frame with the video frame number of n may be referred to as an $n^{th}$ frame of the target video. Further, the application server may track pixels in each image pair of the target video by using a cloud forward-backward optical flow method. The cloud forward-backward optical flow method may be collectively referred to as an optical flow method, and the optical flow method may be used for calculating a pixel displacement between two video frames in each image pair.

It may be understood that each image pair may be formed by two adjacent video frames. Therefore, one video frame in each image pair may be referred to as a first video frame, and the other video frame in each image pair may be referred to as a second video frame, so that step S202 may be further performed.

For ease of understanding, in this embodiment of the present application, two video frames in each image pairs obtained from a target video may be collectively referred to as a first video frame and a second video frame, that is, the application server may obtain a first video frame and a second video frame adjacent to each other from a target video.

Step S202. Determine an average displacement matrix corresponding to the first video frame based on an optical flow tracking rule corresponding to the target video, pixels in the first video frame, and pixels in the second video frame.

Specifically, the application server may extract all pixels of the first video frame. All the extracted pixels may be collectively referred to as pixels. The optical flow tracking rule corresponding to the target video may include the cloud forward-backward optical flow method or may include a cloud displacement integration method and a cloud displacement difference method. It is to be understood that an optical flow operation may be performed on pixels in a first video frame and pixels in a second video frame in each image pair by using the optical flow tracking rule, to obtain an optical flow tracking result corresponding to each image pair, so that a target state matrix and a target displacement matrix that correspond to each image pair may be determined based on the optical flow tracking result. Pixels in a video frame may also be directly tracked by using the target state matrix and the target displacement matrix, but the tracking result may not be very accurate. To improve the accuracy of tracking, when displacements of pixels between the first video frame and the second video frame are calculated, information of displacements of pixels around the pixels may be considered. For example, for each pixel in the first video frame, the application server may select an image block (including the pixel and pixels around the pixel) around the pixel by using the pixel as a center, and calculate an average displacement of all pixels in the image block as a displacement of the pixel. The calculation amount of such a processing manner may be relatively large. According to this embodiment of this application, a displacement integral operation may be further performed on the target state matrix and the target displacement matrix that correspond to each image pair by using the optical flow tracking rule, to obtain a state integral matrix and a displacement integral matrix that correspond to each image pair. Further, a displacement differential operation may be further performed on the state integral matrix and the displacement integral matrix that correspond to each image pair by using the optical flow tracking rule, to obtain an average displacement matrix corresponding to each image pair. In other words, the average displacement matrix that can be used for accurately tracking location information of pixels in a first video frame in each image pair may be accurately obtained by using the optical flow tracking rule.

The application server can calculate average displacements of the pixels in the first video frame and the pixels in the second video frame in batches by using the displacement integral operation and the displacement differential operation, thereby improving an operation speed and improving efficiency of processing pixels and video frames.

The cloud forward-backward optical flow method may be used for synchronously performing forward-backward optical flow calculation on a first video frame and a second video frame in each image pair, to obtain an optical flow tracking result corresponding to each image pair. In other words, the optical flow tracking result obtained by the application server may include a forward displacement matrix corresponding to the first video frame in each image pair and a backward displacement matrix corresponding to the second video frame in each image pair. In this embodiment of the present application, each matrix element in the forward displacement matrix and the backward displacement matrix may include displacements in two dimensions (for example, ($\Delta x$, $\Delta y$)). The displacements in the two dimensions may be understood as a displacement (that is, $\Delta x$) of the same pixel in a horizontal direction and a displacement (that is, $\Delta y$) of the same pixel in a vertical direction. It is to be understood that after each image pair in the target video is calculated by using the optical flow method, a forward horizontal displacement matrix, a forward vertical displacement matrix, a backward horizontal displacement matrix, and a backward vertical displacement matrix may be obtained, and the obtained four matrices may be referred to as an optical flow result. Further, the application server may set an initial state matrix for a first video frame in each image pair, and then whether pixels in the first video frame in each image pair meet a target screening condition may be determined according to the obtained forward displacement matrix and backward displacement matrix. If there are pixels meeting the target screening condition in the first video frame, the application server may determine the pixels meeting the target screening condition as valid pixels, and then correct the initial state matrix corresponding to the first video frame and the forward displacement matrix according to the determined valid pixels, to obtain a target state matrix and a target displacement matrix that correspond to the first video frame in each image pair. Further, the application server may determine an average displacement matrix corresponding to the first video frame in each image pair by using the cloud displacement integration method, the cloud displacement difference method, and the obtained target state matrix and target displacement matrix.

In this embodiment of the present application, the forward horizontal displacement matrix and the forward vertical displacement matrix may be collectively referred to as the forward displacement matrix, and the backward horizontal displacement matrix and the backward vertical displacement matrix may be collectively referred to as the backward displacement matrix. For ease of understanding, in this embodiment of the present application, an image pair in a plurality of image pairs is used as an example to describe a process of obtaining an average displacement matrix corresponding to the image pair by using a first video frame and a second video frame in the image pair. The first video frame in the image pair may be the video frame with the video frame number of 1, and the second video frame may be the video frame with the video frame number of 2. Therefore, an image pair formed by the video frame with the video frame number of 1 and the video frame with the video frame number of 2 is referred to as an image pair 1, and the image pair 1 may be represented as (1, 2).

A forward displacement matrix corresponding to the image pair 1 obtained after calculation by the optical flow method may include a forward horizontal displacement matrix (for example, the forward horizontal displacement matrix may be a matrix $Q_{1,2,x}$) and a forward vertical displacement matrix (for example, the forward vertical displacement matrix may be a matrix $Q_{1,2,y}$). It is to be understood that each matrix element in the matrix $Q_{1,2,x}$ may be understood as a displacement of each pixel in the first video frame in the second video frame in a horizontal direction. That is, each matrix element in the forward horizontal displacement matrix may be referred to as a first transverse displacement corresponding to each pixel in the first video frame. Similarly, each matrix element in the matrix $Q_{1,2,y}$ may be understood as a displacement of each pixel in the first video frame in the second video frame in a vertical direction. That is, each matrix element in the forward vertical displacement matrix may be referred to as a first longitudinal displacement corresponding to each pixel in the first video frame. In other words, sizes of the two matrices (that is, the matrix $Q_{1,2,x}$ and the matrix $Q_{1,2,y}$) obtained by the optical flow calculation method are the same as a size of the first video frame, that is, each matrix element may correspond to one pixel in the first video frame.

Similarly, a backward displacement matrix corresponding to the image pair 1 obtained after calculation by the optical flow method may include a backward horizontal displacement matrix (for example, the backward horizontal displacement matrix may be a matrix $Q_{2,1,x}$) and a backward vertical displacement matrix (for example, the backward vertical displacement matrix may be a matrix $Q_{2,1,y}$). It is to be understood that each matrix element in the matrix $Q_{2,1,x}$ may be understood as a displacement of each pixel in the second video frame in the first video frame in a horizontal direction. That is, each matrix element in the backward horizontal displacement matrix may be referred to as a second transverse displacement corresponding to each pixel in the second video frame. Similarly, each matrix element in the matrix $Q_{2,1,y}$ may be understood as a displacement of each pixel in the second video frame in the first video frame in a vertical direction. That is, each matrix element in the backward vertical displacement matrix may be referred to as a second longitudinal displacement corresponding to each pixel in the second video frame. In other words, sizes of the two matrices (that is, the matrix $Q_{2,1,x}$ and the matrix $Q_{2,1,y}$) obtained by the optical flow calculation method are the same as a size of the second video frame, that is, each matrix element may correspond to one pixel in the second video frame.

It is to be understood that for each video frame in a target video, a quantity of pixels in each video frame is the same. Therefore, sizes of the four matrices (that is, the matrix $Q_{1,2,x}$, the matrix $Q_{1,2,y}$, the matrix $Q_{2,1,x}$, and the matrix $Q_{2,1,y}$) obtained by the optical flow calculation method that correspond to the image pair 1 are the same. For example, if there are m*n pixels in each video frame, the sizes of the obtained four matrices may be m*n. In view of this, each matrix element in the forward horizontal displacement matrix and the forward vertical displacement matrix can correspond to a corresponding pixel in the first video frame. Therefore, each matrix element in the forward displacement matrix corresponding to the image pair 1 may represent a displacement of each pixel in the first video frame in two dimensions in the second video frame. The forward displacement matrix corresponding to the image pair 1 may be collectively referred to as a forward displacement matrix corresponding to the first video frame. Similarly, each matrix element in the backward displacement matrix corresponding to the image pair 1 may represent a displacement of each pixel in the second video frame in two dimensions in the first video frame. The backward displacement matrix corresponding to the image pair 1 may be collectively referred to as a backward displacement matrix corresponding to the second video frame.

In view of this, the application server may forward map the pixels in the first video frame to the second video frame based on the first location information of the pixels in the first video frame and the optical flow tracking rule, determine, in the second video frame, second location information of first mapped points obtained through the mapping, and determine the forward displacement matrix corresponding to the first video frame based on the first location information of the pixels and the second location information of the first mapped points. Further, the application server may backward map the pixels in the second video frame to the first video frame based on the second location information of the pixels in the second video frame and the optical flow tracking rule, determine, in the first video frame, third location information of second mapped points obtained through the mapping, and determine the backward displacement matrix corresponding to the second video frame based on the second location information of the first mapped points and the third location information of the second mapped points. The first mapped points and the second mapped points are pixels obtained by mapping pixels in one video frame to the other video frame in an image pair by using the optical flow method.

Further, the application server may determine pixels meeting a target screening condition in the pixels as valid pixels based on the first location information of the pixels in the first video frame, the forward displacement matrix, and the backward displacement matrix. A specific process in which the application server determines the valid pixels may be described as follows.

The application server may obtain a first pixel from the pixels in the first video frame, determine first location information of the first pixel in the first video frame, and determine, in the forward displacement matrix, a first transverse displacement and a first longitudinal displacement that correspond to the first pixel. Further, the application server may forward map the first pixel to the second video frame based on the first location information of the first pixel and the first transverse displacement and the first longitudinal displacement that correspond to the first pixel, and determine, in the second video frame, second location information of a second pixel obtained through the mapping. Further, the application server may determine, in the backward displacement matrix, a second transverse displacement and a second longitudinal displacement that correspond to the second pixel, backward map the second pixel to the first video frame based on the second location information of the second pixel and the second transverse displacement and the second longitudinal displacement that correspond to the second pixel, and determine, in the first video frame, third location information of a third pixel obtained through the mapping. Further, the application server may determine an error distance between the first pixel and the third pixel based on the first location information of the first pixel and the third location information of the third pixel, and determine, according to the first location information of the first pixel and the second location information of the second pixel, a correlation coefficient between an image block including the first pixel and an image block including the second pixel. Further, the application server may determine pixels of which the error distance is less than an error distance threshold and the correlation coefficient is greater than or equal to a correlation coefficient threshold in the pixels as the valid pixels.

To verify the correctness of the matrix elements in the forward displacement matrix and the backward displacement matrix in the obtained optical flow tracking result, in this embodiment of the present application, the matrix elements in the four displacement matrices may be screened in a matrix transformation manner, that is, the matrix elements with a larger displacement error at corresponding locations of the corresponding pixels in the four matrices may be removed by using a change of matrix elements at positions of corresponding pixels in the constructed initial state matrix, that is, the valid pixels may be determined from the pixels in the first video frame.

Figure 9:
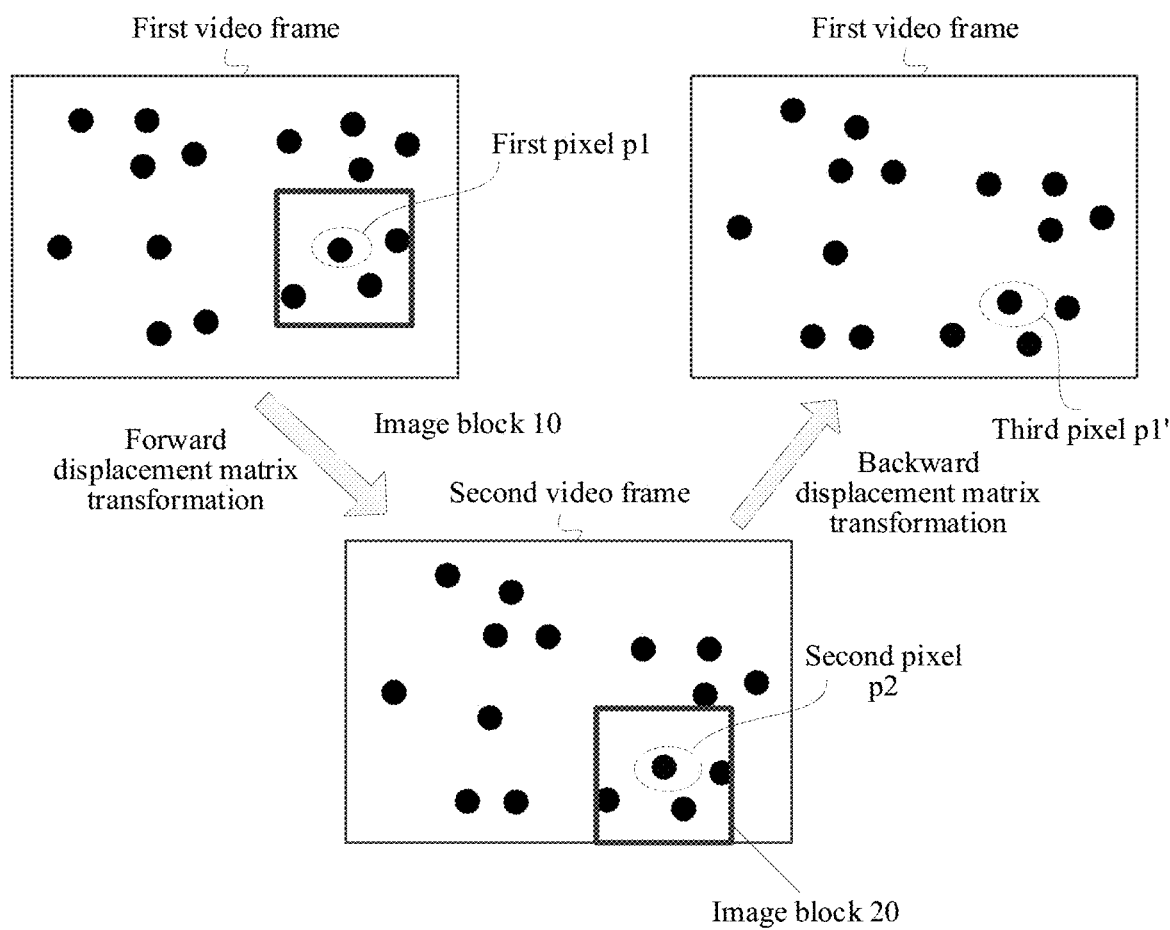
FIG. 9 is a method for determining a valid pixel according to an embodiment of this application.

For ease of understanding, further, FIG. 9 is a method for determining a valid pixel according to an embodiment of this application. As shown in FIG. 9, before screening the matrix elements in the four matrices, the application server may first initialize a state matrix $S_1$ having the same size as the first video frame. In this case, the application server may refer to the state matrix $S_1$ as an initial state matrix. In the initial state matrix, values of matrix elements corresponding to pixels may be referred to as first values. In this case, the first values in the initial state matrix are all zero. A change of the values of the matrix elements in the initial state matrix may be used for representing whether pixels in a first video frame meets a target screening condition, and pixels meeting the target screening condition may be used as valid tracked pixels (that is, valid pixels).

As shown in FIG. 9, a first image frame may be the video frame with the video frame number of 1 in the image pair 1. The pixels in the first video frame may include a first pixel p1 shown in FIG. 9, that is, the first pixel p1 may be a pixel in all pixels of the first video frame, and location information of the first pixel p1 in the first video frame may be referred to as first location information. Further, the application server may find a first transverse displacement corresponding to the first pixel p1 from a forward horizontal displacement matrix in the forward displacement matrix, find a first longitudinal displacement corresponding to the first pixel p1 from a forward vertical displacement matrix in the forward displacement matrix, forward map the first pixel p1 to a second video frame shown in FIG. 9 based on the first location information of the first pixel p1 and the first transverse displacement and the first longitudinal displacement that correspond to the first pixel p1, and determine, in the second video frame, second location information of a second pixel p2 obtained through the mapping. It may be understood that in this case, the second pixel p2 is a pixel obtained after matrix transformation is performed on the first pixel p1. Further, the application server may determine, in the backward displacement matrix, a second transverse displacement and a second longitudinal displacement that correspond to the second pixel p2, backward map the second pixel p2 to the first video frame shown in FIG. 9 according to the second location information of the second pixel p2 and the second transverse displacement and the second longitudinal displacement that correspond to the second pixel p2, and determine, in the first video frame, third location information of a third pixel p1' obtained through the mapping. It may be understood that in this case, the third pixel p1' is a pixel obtained after matrix transformation is performed on the second pixel p2 obtained by mapping the first pixel p1.

Further, the application server may determine, in the first video frame, a location error tit, between two locations of the first location information of the first pixel p1 and the third location information of the third pixel p1' obtained after the matrix transformation is performed. Further, the application server may select an image block 10 with a size of k*k pixels (for example, 8*8 pixels) in the first video frame shown in FIG. 9 by using the first location information of the first pixel p1 as a center. In addition, as shown in FIG. 9, the application server may similarly select an image block 20 with a size of k*k pixels in the second video frame shown in FIG. 9 by using the second location information of the second pixel p2 as a center, and calculate a correlation coefficient between the two image blocks (the correlation coefficient may be $N_{1,2}$).

A calculation expression of the correlation coefficient $N_{1,2}$ is as follows:

$$N_{1,2} = \frac{\sum_{a=1}^{k}\sum_{b=1}^{k}(\text{patch}_1(a,b) - E(\text{patch}_1))(\text{patch}_2(a,b) - E(\text{patch}_2))}{\sqrt{\sum_{a=1}^{k}\sum_{b=1}^{k}(\text{patch}_1(a,b) - E(\text{patch}_1))^2(\text{patch}_2(a,b) - E(\text{patch}_2))^2}}$$

Formula (1)

where $\text{patch}_1(a,b)$ in formula (1) may represent a pixel value of a pixel at a location of a $a^{th}$ row and a $b^{th}$ column of the image block 10 shown in FIG. 9. The pixel value may be a grayscale value of a pixel, which is between 0 and 255. $E(\text{patch}_1)$ represents an average pixel value of the image block 10 shown in FIG. 9. $\text{patch}_2(a,b)$ represent a pixel value of a pixel at a location of a $a^{th}$ row and a $b^{th}$ column of the image block 20 shown in FIG. 9. $E(\text{patch}_2)$ represents an average pixel value of the image block 20 shown in FIG. 9.

It may be understood that in this embodiment of the present application, after an error distance between the first pixel p1 and the third pixel p1' shown in FIG. 9 is obtained through calculation, and the calculated error distance may be compared with a preset error distance. If $t_{11'} < T_B$ and $N_{12'} >= T_A$ ($T_B$ is a set error distance threshold, $T_A$ is a set correlation coefficient threshold), it represents that the first pixel p1 in the first video frame meets the target screening condition, so that the first pixel p1 may be determined as a valid pixel.

Further, the application server may set a value of a matrix element at a corresponding location in the initial state matrix $S_1$ corresponding to the first pixel p1 to a second value. For example, a value of an element corresponding to the first pixel p1 in the initial state matrix $S_1$ may be switched from 0 to 1, to represent that the first pixel p1 in the first video frame is the valid pixel. Otherwise, if $t_{11'} >= T_B$ and/or $N_{12'} < T_A$, it represents that the first pixel p1 in the first video frame does not meet the target screening condition. In this case, the application server may determine that the first pixel p1 shown in FIG. 9 is an invalid tracked pixel. That is, the value of the element corresponding to the first pixel p1 in the initial state matrix $S_1$ is still 0. Meanwhile, the application server may further set a value of a matrix element at a corresponding location of the first pixel p1 in the forward displacement matrix (that is, the matrix $Q_{1,2,x}$ and the matrix $Q_{1,2,y}$) to 0, and determine the forward displacement matrix including the first value as a target displacement matrix (for example, the forward horizontal displacement matrix $Q_{x1}$ and the forward vertical displacement matrix $Q_{y1}$). That is, matrix elements at locations in the target displacement matrix may be used for representing a matrix determined after screening and filtering out mistracking displacements with larger errors from the forward displacement matrix.

It may be understood that for other pixels shown in FIG. 9, a pixel may be sequentially selected from the first video frame shown in FIG. 9 as a first pixel, the step of determining the valid pixel is repeated until all pixels in the first video frame are used as first pixels, and all valid pixels in the first video frame may be determined. Therefore, matrix elements in the initial state matrix may be updated based on location information of the valid pixels in the initial state matrix, and the initial state matrix including the second value may be determined as a target state matrix $S_1$ corresponding to the first video frame. The target displacement matrix (that is, a target horizontal displacement matrix $Q_{x,1}$ and a target vertical displacement matrix $Q_{y,1}$) corresponding to the first video frame may be obtained. Similarly, for other image pairs in the plurality of image pairs, the step of determining the valid pixels in the image pair 1 is repeated, and a target state matrix and a target displacement matrix that correspond to a first video frame in each image pair in the remaining image pairs may also be obtained. For example, for a plurality of consecutive video frames with video frame numbers of 1, 2, 3, 4, . . . , and n in a target video, a plurality of formed image pairs may be represented as (1, 2), (2, 3), (3, 4), . . . , and (n−1, n). Accordingly, for an optical tracking result corresponding to each image pair, a target state matrix $S_1$ corresponding to the image pair (1, 2) and a target displacement matrix $Q_1$ (that is, the target horizontal displacement matrix $Q_{x,1}$ and the target vertical displacement matrix $Q_{y,1}$) corresponding to the image pair (1, 2) may be finally obtained in the valid pixel determining manner. By analogy, a target state matrix $S_{n-1}$ corresponding to the image pair (n−1, n) and a target displacement matrix $Q_{n-1}$ (that is, the target horizontal displacement matrix $Q_{x,n-1}$ and the target vertical displacement matrix $Q_{y,n-1}$) corresponding to the image pair (1, 2) may be obtained.

Further, the application server may perform an integral operation on the target state matrix $S_1$ and the target displacement matrix $Q_1$ that correspond to the image pair 1 by using a cloud displacement integration method, to obtain a state integral matrix $S_{in}(x, y)$ and a displacement integral matrix $Q_{in}(x, y)$ that correspond to the pixels in the first video frame. The displacement integral matrix $Q_{in}(x, y)$ may include a transverse displacement integral matrix $Q_{x,in}(x, y)$ and a longitudinal displacement integral matrix $Q_{y,in}(x, y)$. The state integral matrix $S_{in}(x, y)$, the transverse displacement integral matrix $Q_{x,in}(x, y)$, and the longitudinal displacement integral matrix $Q_{y,in}(x, y)$ may be obtained by using the following matrix integral formula:

$$S_{in}(x, y) = \sum_{x' \le x, y' \le y} S(x', y') \quad \text{Formula (2)}$$

$$Q_{x,in}(x, y) = \sum_{x' \le x, y' \le y} Q_x(x', y') \quad \text{Formula (3)}$$

$$Q_{y,in}(x, y) = \sum_{x' \le x, y' \le y} Q_y(x', y') \quad \text{Formula (4)}$$

where x and y in formula (2), formula (3), and formula (4) may be used for representing coordinates of all matrix elements in the state integral matrix and the displacement integral matrix that correspond to the first video frame, for example, $S_{in}(x, y)$ may represent a value of a matrix element of an $x^{th}$ row and an $y^{th}$ column of the state integral matrix.

In addition, x' and y' in formula (2), formula (3), and formula (4) may be used for representing coordinates of matrix elements in the target state matrix and the target displacement matrix, for example, S(x', y') may represent a value of a matrix element of an $x^{th}$ row and a $y^{th}$ column of the target state matrix.

Further, the application server may select a target frame with a height of M and a width of N from the first video frame by using a cloud displacement difference method, and perform a displacement differential operation on the three integral matrices obtained by using formula (2), formula (3), and formula (4) in the target frame, to obtain a state differential matrix $S_{dif}(x, y)$ and a displacement differential matrix $Q_{dif}(x, y)$ respectively. The target frame is to select all pixels in a specific region around the pixels to calculate an average displacement. For example, a size of the target frame is 80*80 pixels.

The displacement differential matrix $Q_{dif}(x, y)$ may include a transverse displacement differential matrix $Q_{x,dif}(x, y)$ and a longitudinal displacement differential matrix $Q_{y,dif}(x, y)$. The state differential matrix $S_{dif}(x, y)$, the transverse displacement differential matrix $Q_{x,dif}(x, y)$, and the longitudinal displacement differential matrix $Q_{y,dif}(x, y)$ may be obtained by using the following matrix differential formula (5):

$$S_{dif}(x, y) = S_{in}\left(x + \frac{N}{2}, y + \frac{M}{2}\right) -$$
$$S_{in}\left(x - \frac{N}{2}, y + \frac{M}{2}\right) - S_{in}\left(x + \frac{N}{2}, y - \frac{M}{2}\right) + S_{in}\left(x - \frac{N}{2}, y - \frac{M}{2}\right)$$

$$Q_{x,dif}(x, y) = Q_{x,in}\left(x + \frac{N}{2}, y + \frac{M}{2}\right) -$$
$$Q_{x,in}\left(x - \frac{N}{2}, y + \frac{M}{2}\right) - Q_{x,in}\left(x + \frac{N}{2}, y - \frac{M}{2}\right) + Q_{x,in}\left(x - \frac{N}{2}, y - \frac{M}{2}\right)$$

$$Q_{y,dif}(x, y) = Q_{y,in}\left(x + \frac{N}{2}, y + \frac{M}{2}\right) -$$
$$Q_{y,in}\left(x - \frac{N}{2}, y + \frac{M}{2}\right) - Q_{y,in}\left(x + \frac{N}{2}, y - \frac{M}{2}\right) + Q_{y,in}\left(x - \frac{N}{2}, y - \frac{M}{2}\right)$$

It may be understood that in this embodiment of the present application, a region in which the target frame is located in the first video frame may be referred to as a differential region, and an average displacement matrix corresponding to the first video frame may be determined based on size information of the differential region, the state integral matrix, the transverse displacement integral matrix, and the longitudinal displacement integral matrix. That is, M and N in the displacement differential operation formula are a length value and a width value of the differential region. x and y in the displacement differential operation formula are respectively location information of each pixel in the first video frame. An average value of all pixels in the differential region may be quickly obtained by using the displacement differential operation formula. For example, for the state integral matrix, the state differential matrix $S_{dif}(x, y)$ corresponding to the state integral matrix $S_{in}(x, y)$ may be obtained. For the transverse displacement integral matrix $Q_{x,in}(x, y)$ and the longitudinal displacement integral matrix $Q_{y,in}(x, y)$, the transverse displacement differential matrix $Q_{x,dif}(x, y)$ and the longitudinal displacement differential matrix $Q_{y,dif}(x, y)$ may be obtained.

Further, the application server may determine a ratio of the transverse displacement differential matrix $Q_{x,dif}(x, y)$ to the state differential matrix $S_{dif}(x, y)$ as a transverse average displacement matrix $Q_{x,F}(x, y)$, and determine a ratio of the longitudinal displacement differential matrix $Q_{y,dif}(x, y)$ to the state differential matrix $S_{dif}(x, y)$ as a longitudinal average displacement matrix $Q_{y,F}(x, y)$.

$$Q_{x,F}(x, y) = \frac{Q_{x,dif}(x, y)}{S_{dif}(x, y) + e} \qquad \text{Formula (6)}$$

$$Q_{y,F}(x, y) = \frac{Q_{y,dif}(x, y)}{S_{dif}(x, y) + e} \qquad \text{Formula (7)}$$

where e in formula (6) and formula (7) is used for representing a relatively small digit set by a person, for example, 0.001. That is, e in formula (6) and formula (7) is to avoid a case that values of all matrix elements in the state differential matrix $S_{dif}(x, y)$ are 0, and 0 is directly divided. Step S203 may be further performed, so that location information of the pixels in the first video frame appearing in the second video frame may be pre-calculated in the target user terminal.

Step S203. Track location information of the pixels in the first video frame based on the average displacement matrix, and determine location information of pixels being tracked in the second video frame.

Specifically, the application server may further quickly and accurately track location information of the pixels in the first video frame appearing in a next video frame (that is, the second video frame in the image pair 1) based on the average displacement matrix (the average displacement matrix may include the transverse average displacement matrix $Q_{x,F}(x, y)$ and the longitudinal average displacement matrix $Q_{y,F}(x, y)$) obtained in step S203, that is, location information of pixels obtained by tracking the pixels in the first video frame may be determined in the second video frame through displacement transformation.

$$C_x(x,y)=x+Q_{x,F}(x,y) \qquad \text{Formula (8)}$$

$$C_y(x,y)=y+Q_{y,F}(x,y) \qquad \text{Formula (9)}$$

where x in formula (8) is a transverse location coordinate of each pixel in the first video frame, $Q_{x,F}(x, y)$ is a transverse average displacement matrix corresponding to the first video frame, and coordinate transformation may be performed on the transverse location coordinate of each pixel in the first video frame by using formula (8), to obtain a transverse location coordinate of each pixel in the first video frame in a next video frame. Similarly, y in formula (9) is a longitudinal location coordinate of each pixel in the first video frame, $Q_{y,F}(x, y)$ is a longitudinal average displacement matrix corresponding to the first video frame, and coordinate transformation may be performed on the longitudinal location coordinate of each pixel in the first video frame by using formula (9), to obtain a longitudinal location coordinate of each pixel in the first video frame in a next video frame.

It may be understood that for each image pair, pixels in a first video frame in a corresponding image pair may be quickly tracked by using an average displacement matrix corresponding to a first video frame in each image pair, and location coordinates of pixels obtained by tracking may be determined in a second video frame in the corresponding image pair, that is, location information of the pixels obtained by tracking may be determined in the second video frame of the each image pair. The application server may further store the location information of the pixels obtained by tracking in each image pair, to further perform step S204.

Step S204. Generate, based on the location information of the pixels in the first video frame and the location information of the pixels being tracked in the second video frame, trajectory information associated with the target video.

The trajectory information includes target trajectory information used for tracking and displaying multimedia information associated with a target object in the target video.

Step S205. Determine, in response to a trigger operation on a target video, a target pixel in a key video frame of the target video, and obtain multimedia information associated with the target pixel.

Step S206. Determine a trajectory obtaining request corresponding to the target pixel based on location information of the target pixel in the key video frame.

For a specific implementation of step S205 and step S206, reference may be made to the description of the target user terminal in the foregoing embodiment corresponding to FIG. 4. Details are not described herein again.

Step S207. Obtain, in response to the trajectory obtaining request for the target pixel in the key video frame, the trajectory information associated with the target video.

Specifically, the application server may receive a trajectory obtaining request sent by the target user terminal based on a target pixel in a key video frame, and further obtain trajectory information associated with all pixels in the target video pre-calculated by the application server, to further perform step S208.

Step S208. Screen the trajectory information associated with the target video to obtain target trajectory information associated with location information of the target pixel in the key video frame, and return the target trajectory information.

Specifically, the application server may obtain a video frame number of the key video frame in the target video and location information of the target pixel in the key video frame from the trajectory obtaining request, screen trajectory information associated with the target video pre-obtained by the application server to obtain trajectory information associated with the target pixel, refer to the obtained trajectory information as target trajectory information, and further return the target trajectory information to the target user terminal, so that the target user terminal may quickly find, based on the frame number of the key video frame, location information of the target pixel appearing in a next video frame following the key video frame from the received target trajectory information until location information of the target pixel appearing in each video frame after the key video frame is obtained. In this case, the target user terminal may form the location information of the target pixel appearing in each video frame after the key video frame into new trajectory information. In some embodiments, it is to be understood that when obtaining the frame number of the key video frame, the application server may quickly find the location information of the target pixel appearing in the next video frame following the key video frame from the obtained trajectory information until the location information of the target pixel appearing in each video frame after the key video frame is obtained. In this case, the application server may refer to the new trajectory information formed by the location information of the target pixel appearing in each video frame after the key video frame as the target trajectory information.

It may be understood that if the calculation performance of the target user terminal cannot meet a requirement for tracking an object, when generating the trajectory obtaining request corresponding to the target pixel, the target user terminal may send the trajectory obtaining request to the application server, so that the application server may obtain, based on the trajectory obtaining request, the target trajectory information associated with the location information of the target pixel in the key video frame, and return the obtained target trajectory information to the target user terminal.

In some embodiments, if the calculation performance of the target user terminal can meet the requirement for tracking an object, the target user terminal may perform step S201 to step S204 in the target user terminal, to perform full-image pixel tracking on all pixels in the target video in advance in the target user terminal and pre-obtain location information of all the pixels in the target video in each video frame, and perform location integration on the location information of each pixel in the target video in each video frame, to obtain trajectory information corresponding to each pixel in the target video. In this case, the target user terminal may directly obtain, based on the location information of the target pixel in the target object in the key video frame, the target trajectory information associated with the location information of the target pixel in the key video frame in the target user terminal, to further perform step S209.

The target trajectory information includes location information of the target pixel in a next video frame following the key video frame, and the location information of the target pixel in the next video frame following the key video frame is obtained by tracking the target object.

For example, a plurality of consecutive video frames included in a currently played video (that is, a target video) are the following six video frames, and the six video frames may be a video frame a, a video frame b, a video frame c, a video frame d, a video frame e, and a video frame f. Therefore, the application server may pre-process each video frame in the target video at a video preprocessing stage, that is, may determine, based on the optical flow tracking rule, an average displacement matrix corresponding to an image pair formed by every two adjacent video frames in the target video, track all pixels in the first video frame based on an average displacement matrix corresponding to each image pair (or referred to as an average displacement matrix corresponding to a first video frame in each image pair), to obtain location information of all the pixels in the first video frame appearing in a second video frame, and obtain location information of all pixels of the target video in each video frame (that is, all pixels of the target video in the video frame a, the video frame b, the video frame c, the video frame d, the video frame e, and the video frame f), that is, may obtain trajectory information corresponding to all the pixels of the target video based on the location information of all the pixels of the target video in each video frame. The trajectory information corresponding to all the pixels of the target video is referred to as trajectory information associated with the target video.

In another example, when the application server pre-processes the target video, the application server may pre-calculate trajectory information corresponding to a pixel A (for example, the pixel A may be a pixel of all pixels in the target video) in the target video. If the trajectory information corresponding to the pixel A includes location information of the pixel A in each video frame (that is, the video frame a, the video frame b, the video frame c, the video frame d, the video frame e, and the video frame f) of the target video, a key video frame corresponding to a target pixel in the target user terminal is the video frame c of the target video, the pixel A in a target object in the video frame c may be further used as the target pixel, and the target pixel may be the pixel A, the trajectory information of the pixel A may be obtained by screening from the application server, and location information of the pixel A in each video frame (that is, the video frame d, the video frame e, and the video frame f) after the key video frame may be obtained based on the obtained trajectory information of the pixel A.

In this embodiment of the present application, if the key video frame is a first video frame in the target video, target trajectory information obtained by the target user terminal may be the pre-calculated trajectory information. For example, the key video frame is the video frame a (the first video frame) in the target video, the target trajectory information obtained by the target user terminal may include location information of the target pixel in the video frame a, the video frame b, the video frame c, the video frame d, the video frame e, and the video frame f. In some embodiments, if the key video frame is not the first video frame in the target video, the target trajectory information obtained by the target user terminal may be trajectory information formed by a part of location information determined from the pre-calculated trajectory information. For example, the key video frame is the video frame c (that is, not the first video frame) in the target video, the target trajectory information obtained by the target user terminal may include the location information of the target pixel in the video frame d, the video frame e, and the video frame f, and the location information of the target pixel in the video frame d, the video frame e, and the video frame f may be referred to as the part of location information.

It may be understood that, in some embodiments, the target user terminal may alternatively refer to trajectory information (that is, the trajectory information corresponding to the pixel A) including the location information of the target pixel in the key video frame found by the application server as target trajectory information collectively. In this case, the target trajectory information may be considered as the trajectory information corresponding to the pixel A that matches the target pixel and that is found from all the pixels of the target video. Because the trajectory information may include the location information of the pixel A in each video frame of the target video, the location information of the target pixel in each video frame after the key video frame may also be quickly and naturally obtained from the trajectory information.

Step S209. Display the multimedia information based on the location information of the target pixel in the next video frame following the key video frame in the target trajectory information when the next video frame following the key video frame is played.

It may be understood that in this embodiment of the present application, when a target pixel in a target object selected by a target user may be obtained, trajectory information associated with location information of the target pixel in the key video frame may be obtained by screening pre-calculated trajectory information corresponding to all pixels, and the obtained trajectory information may be referred to as target trajectory information. In this embodiment of the present application, pixel tracking may be performed on pixels in each video frame in the video in advance. Therefore, when an average displacement matrix corresponding to a first video frame in each image pair is obtained, location information of each pixel in a corresponding video frame in the video may be quickly obtained. It is to be understood that pre-calculated location information of each pixel in a corresponding video frame may be used for representing location information of each pixel in a corresponding video frame in the video currently played in a video playing interface. Therefore, when obtaining the target pixel in the target object and multimedia information associated with the target object, the application server may quickly refer to trajectory information corresponding to the target pixel obtained by screening trajectory information corresponding to all pixels as target trajectory information, and return the target trajectory information to the target user terminal, so that the target user terminal may track and display, based on location information of the target pixel in each video frame after the key video frame carried in the target trajectory information, the multimedia information (for example, bullet comment data) associated with the target object.

It may be understood that if a trajectory formed by the location information of the target pixel in a plurality of consecutive video frames after the key video frame is a circle, then the bullet comment data may be tracked and displayed in a circle in the target user terminal.

Figure 10:
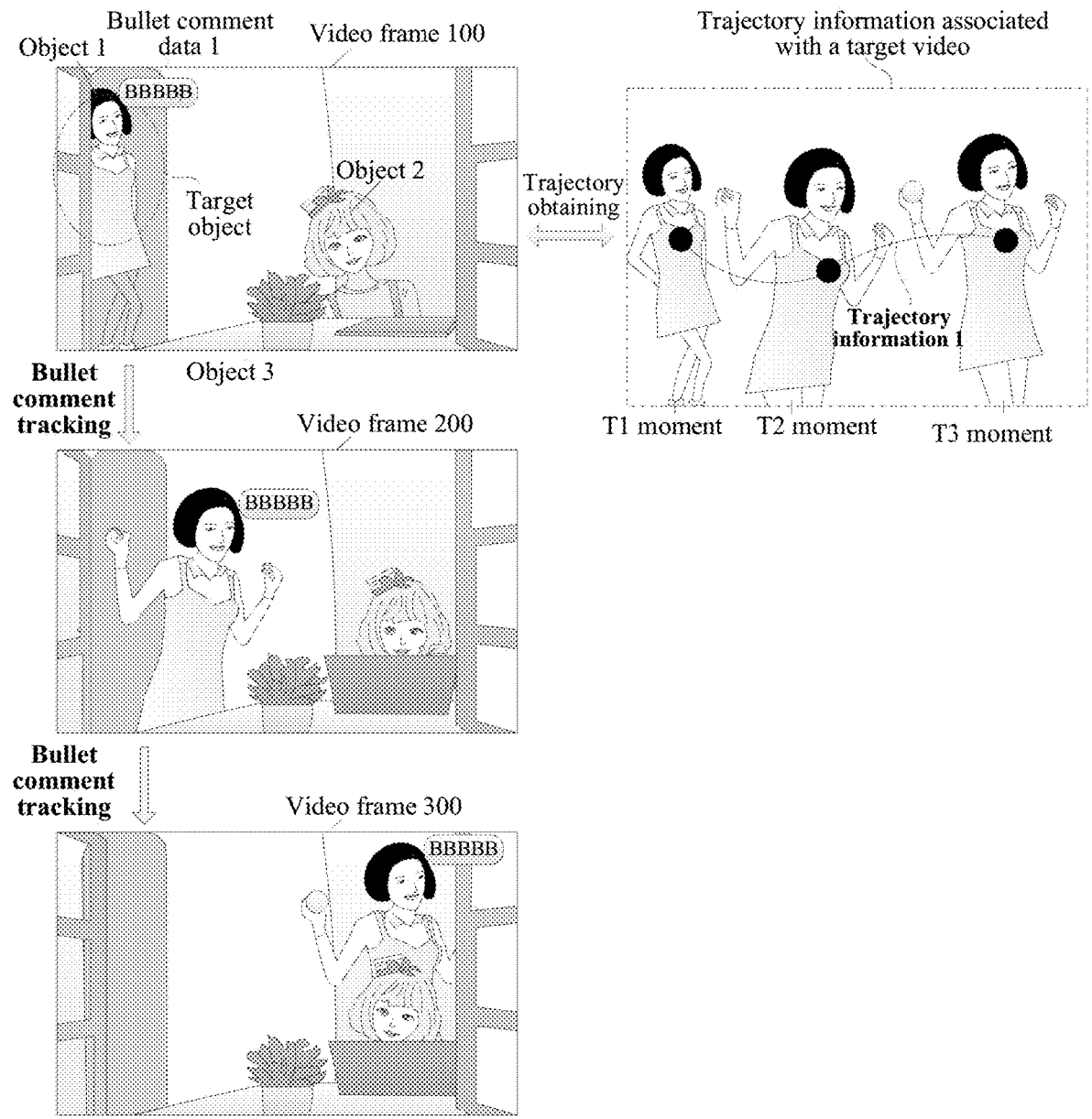
FIG. 10 is a schematic diagram of displaying bullet comment data based on trajectory information according to an embodiment of this application.

For ease of understanding, FIG. 10 is a schematic diagram of displaying bullet comment data based on trajectory information according to an embodiment of this application. As shown in FIG. 10, a video frame 100 may include a plurality of objects, for example, may include an object 1, an object 2, and an object 3 shown in FIG. 10. If a target user uses the object 1 shown in FIG. 10 in a target user terminal as a target object, the video frame 100 may be referred to as a key video frame, and a pixel corresponding to a trigger operation performed by the target user in the target object may be referred to as a target pixel. If the target user terminal has relatively strong calculation performance, location information of each pixel in each video frame in a target video may be pre-calculated in the target user terminal, and trajectory information associated with the target video may be obtained in the target user terminal. For example, trajectory information 1 shown in FIG. 10 may be pre-calculated, that is, location information in the trajectory information 1 is determined by the location information of the pixels in each video frame in the target video. Therefore, the target user terminal may quickly consider the trajectory information 1 shown in FIG. 10 as target trajectory information based on location information of a target pixel in the object 1, and quickly track and display, based on location information of the object 1 in the trajectory information 1 in each video frame (that is, a video frame 200 and a video frame 300 shown in FIG. 10) after the key video frame, multimedia information (that is, bullet comment data 1 shown in FIG. 10 is BBBBB) associated with the target object (that is, the object 1). That is, the bullet comment data displayed in the video frame 200 and the video frame 300 shown in FIG. 10 is determined by location information in the trajectory information 1 shown in FIG. 10.

It may be understood that trajectory information associated with the target video shown in FIG. 10 may be alternatively pre-calculated by the application server, so that when the application server receives a trajectory obtaining request for a target pixel in the object 1, trajectory information associated with location information of the target pixel in the key video frame may also be quickly obtained from the trajectory information associated with target video shown in FIG. 10, that is, full-image pixel tracking is performed on all pixels in the target video in the application server, and a calculation amount of the target user terminal can be effectively reduced, so that it may be ensured that when obtaining the trajectory information 1 shown in FIG. 10, the target user terminal may quickly track and display the bullet comment data 1 shown in FIG. 10 based on the location information in the trajectory information 1, thereby improving flexibility of display of bullet comment data. It is to be understood that there may be a plurality of bullet comments associated with the target object in a video playing interface. However, when the target user terminal detects that a plurality of bullet comments in the video playing interface overlap, these overlapped bullet comments may be merged, to retain the latest bullet comment obtained by the target user terminal among these overlapped bullet comment.

In this embodiment of the present application, when a trigger operation of the target user on the target video is obtained, a video frame corresponding to the trigger operation in the target video may be referred to as a key video frame, so that a target pixel may be determined from the key video frame and multimedia information (for example, the multimedia information may be bullet comment data such as a user text, a picture, or an expression in the target video) associated with the target pixel and associated with a target object in which the target pixel is located may be obtained. Further, a trajectory obtaining request corresponding to the target pixel is determined based on the location information of the target pixel in the key video frame, and target trajectory information associated with the location information of the target pixel in the key video frame may be obtained based on the trajectory obtaining request, so that when a next video frame following the key video frame is played, bullet comment data associated with the target pixel and a target object in which the target pixel is located can be displayed based on the target trajectory information. In view of this, in this embodiment of the present application, when a key video frame is determined, trajectory information of all pixels in the key video frame may be screened to obtain trajectory information of a target pixel, and the obtained trajectory information of the target pixel is used as target trajectory information, thereby enriching a display effect of bullet comment data based on the obtained target trajectory information. For example, for target pixels in different target objects, obtained target trajectory information may be different, and the display effect of the bullet comment data is different. In addition, location information of bullet comment data in each video frame after the key video frame may be quickly determined based on an association relationship between a target object and the bullet comment data. In other words, the bullet comment data always changes with the target object in the target video, thereby enriching a visual display effect of a user text in a video and implementing a stronger correlation between bullet comment data and a target object or an object in a commented video.

Figure 11:
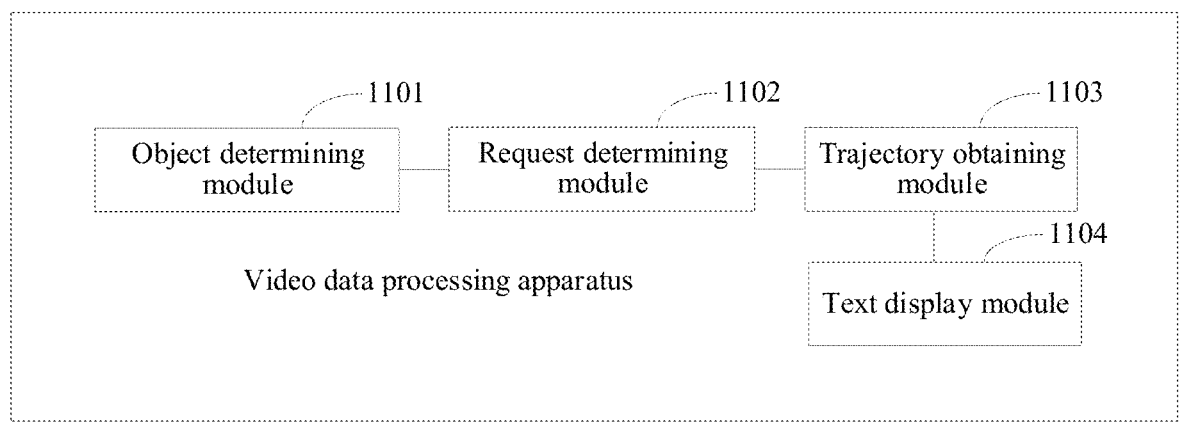
FIG. 11 is a schematic structural diagram of a video data processing apparatus according to an embodiment of this application.

Further, FIG. 11 is a schematic structural diagram of a video data processing apparatus according to an embodiment of this application. As shown in FIG. 11, the video data processing apparatus 1 may be applicable to the target user terminal in the foregoing embodiment corresponding to FIG. 1. The video data processing apparatus 1 may include: an object determining module 1101, a request determining module 1102, a trajectory obtaining module 1103, and text display module 1104.

The object determining module 1101 is configured to: determine, in response to a trigger operation on a target video, a target pixel in a key video frame of the target video, and obtain multimedia information associated with the target pixel, the key video frame being a video frame in which the trigger operation is located, and the target pixel being a pixel corresponding to the trigger operation in the key video frame.

The request determining module 1102 is configured to determine a trajectory obtaining request corresponding to the target pixel based on location information of the target pixel in the key video frame.

The trajectory obtaining module 1103 is configured to obtain, based on the trajectory obtaining request, target trajectory information associated with the location information of the target pixel in the key video frame, the target trajectory information including location information of the target pixel in a next video frame following the key video frame, the location information of the target pixel in the next video frame following the key video frame being obtained by tracking the target pixel.

The text display module 1104 is configured to display the multimedia information based on the location information of the target pixel in the next video frame following the key video frame in the target trajectory information when the next video frame following the key video frame is played.

For specific implementations of the object determining module 1101, the request determining module 1102, the trajectory obtaining module 1103, and the text display module 1104, reference may be made to the description of step S101 to step S104 in the foregoing embodiment corresponding to FIG. 4. Details are not described herein again.

In this embodiment of the present application, when a trigger operation of the target user on the target video is obtained, a video frame corresponding to the trigger operation in the target video may be used as a key video frame, so that a target pixel may be determined from the key video frame and multimedia information (for example, the multimedia information may be bullet comment data such as a user text, a picture, or an expression in the target video) associated with the target pixel and associated with a target object in which the target pixel is located may be obtained. Further, a trajectory obtaining request corresponding to the target pixel is determined based on the location information of the target pixel in the key video frame, and target trajectory information associated with the location information of the target pixel in the key video frame may be obtained based on the trajectory obtaining request, so that when a next video frame following the key video frame is played, bullet comment data associated with the target pixel and a target object in which the target pixel is located can be displayed based on the target trajectory information. In view of this, in this embodiment of the present application, when a key video frame is determined, trajectory information of all pixels in the key video frame may be screened to obtain trajectory information of a target pixel, and the obtained trajectory information of the target pixel is used as target trajectory information, thereby enriching a display effect of bullet comment data based on the obtained target trajectory information. For example, for target pixels in different target objects, obtained target trajectory information may be different, and the display effect of the bullet comment data is different. In addition, location information of bullet comment data in each video frame after the key video frame may be quickly determined based on an association relationship between a target object and the bullet comment data. In other words, the bullet comment data always changes with the target object in the target video, thereby enriching a visual display effect of a user text in a video and implementing a stronger correlation between bullet comment data and a target object or an object in a commented video.

Figure 12:
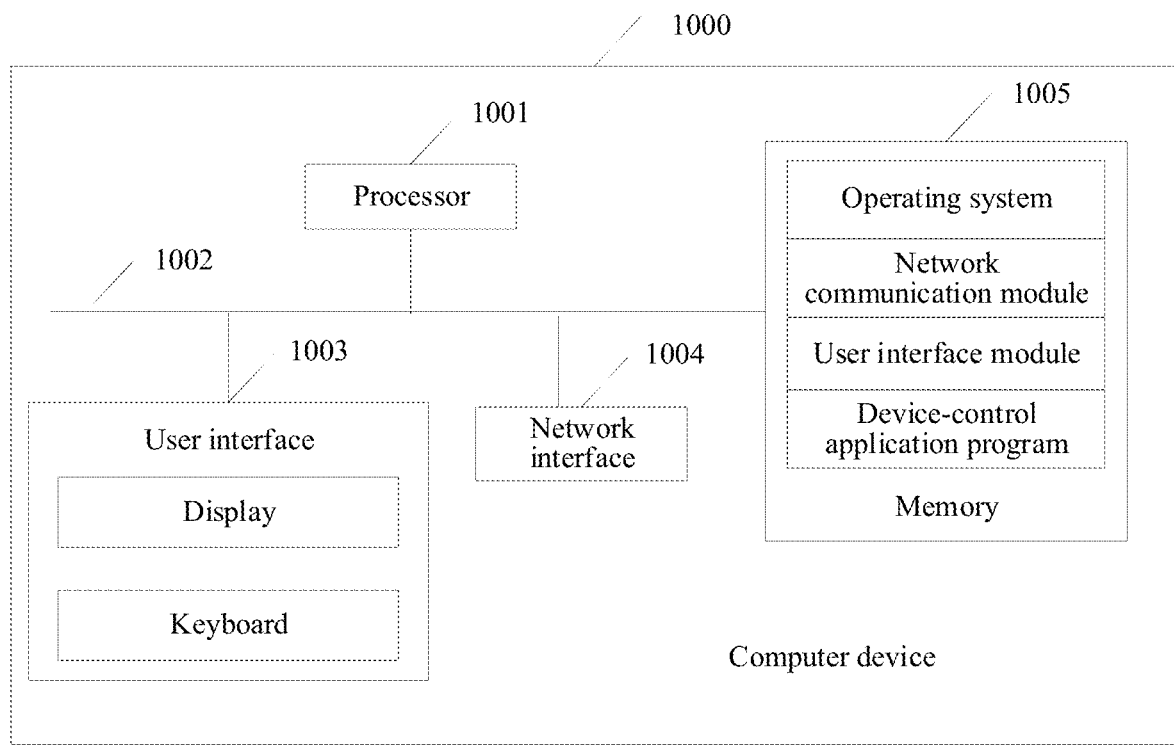
FIG. 12 is a schematic structural diagram of a computer device according to an embodiment of this application.

Further, FIG. 12 is a schematic structural diagram of a computer device according to an embodiment of this application. As shown in FIG. 12, the computer device 1000 may be the target user terminal in the foregoing embodiment corresponding to FIG. 1. The computer device 1000 may include: a processor 1001, a network interface 1004, and a memory 1005. In addition, the computer device 1000 may include: a user interface 1003 and at least one communication bus 1002. The communication bus 1002 is configured to implement connection and communication between these components. The user interface 1003 may include a display and a keyboard. In some embodiments, the user interface 1003 may further include a standard wired interface and wireless interface. In some embodiments, the network interface 1004 may include a standard wired interface and a standard wireless interface (such as a Wi-Fi interface). The memory 1004 may be a high-speed RAM, or may be a non-volatile memory, for example, at least one magnetic disk memory. In some embodiments, the memory 1005 may be at least one storage apparatus that is located far away from the foregoing processor 1001. As shown in FIG. 12, the memory 1005 used as a computer storage medium may include an operating system, a network communication module, a user interface module, and a device-control application program.

In the computer device 1000 shown in FIG. 12, the network interface 1004 may be configured to provide a network communication function. The user interface 1003 is mainly configured to provide an input interface for a user. The processor 1001 may be configured to invoke the device-control application program stored in the memory 1005, to implement the following operations: determining, in response to a trigger operation on a target video, a target pixel in a key video frame of the target video, and obtaining multimedia information associated with the target pixel, the key video frame being a video frame in which the trigger operation is located, and the target pixel being a pixel corresponding to the trigger operation in the key video frame; determining a trajectory obtaining request corresponding to the target pixel based on location information of the target pixel in the key video frame; obtaining, based on the trajectory obtaining request, target trajectory information associated with the location information of the target pixel in the key video frame, the target trajectory information including location information of the target pixel in a next video frame following the key video frame, the location information of the target pixel in the next video frame following the key video frame being obtained by tracking the target pixel; and displaying the multimedia information based on the location information of the target pixel in the next video frame following the key video frame in the target trajectory information when the next video frame following the key video frame is played.

It is to be understood that the computer device 1000 described in this embodiment of the present application can implement the descriptions of the video data processing method in the foregoing embodiment corresponding to FIG. 4, and can also implement the descriptions of the video data processing apparatus 1 in the foregoing embodiment corresponding to FIG. 11. Details are not described herein again. In addition, the description of beneficial effects of using the same method are not described herein again.

In addition, the embodiments of this application further provide a computer storage medium. The computer storage medium stores a computer program executed by the video data processing apparatus 1 mentioned above, and the computer program includes program instructions. When executing the program instructions, the processor can perform the descriptions of the video data processing method in the foregoing embodiment corresponding to FIG. 4. Therefore, details are not described herein again. In addition, the description of beneficial effects of using the same method are not described herein again. For technical details that are not disclosed in the computer storage medium embodiments of this application, refer to the descriptions of the method embodiments of this application.

Figure 13:
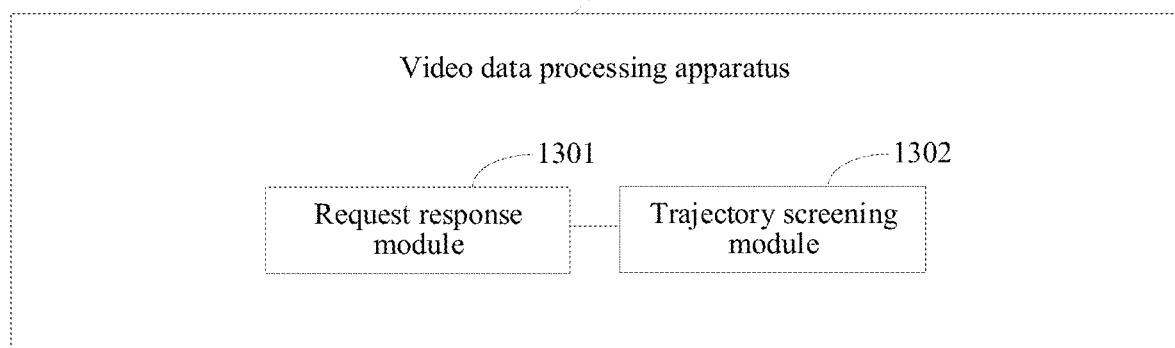
FIG. 13 is a schematic structural diagram of another video data processing apparatus according to an embodiment of this application.

Further, FIG. 13 is a schematic structural diagram of another video data processing apparatus according to an embodiment of this application. As shown in FIG. 13, the video data processing apparatus 2 may be applicable to the application server in the foregoing embodiment corresponding to FIG. 8. The application server may be the server 2000 in the foregoing embodiment corresponding to FIG. 1. The video data processing apparatus 2 may include: a request response module 1301 and a trajectory screening module 1302.

The request response module 1301 is configured to obtain, in response to a trajectory obtaining request for a target pixel in a key video frame, trajectory information associated with a target video, the key video frame being a video frame in the target video, the target pixel being a pixel in the key video frame, the trajectory information being determined by location information of pixels in each video frame of the target video.

The trajectory screening module 1302 is configured to: screen the trajectory information associated with the target video to obtain target trajectory information associated with location information of the target pixel in the key video frame, and return the target trajectory information, the target trajectory information including target location information, the target location information being used for triggering display of multimedia information associated with the target pixel in a next video frame following the key video frame.

For specific implementations of the request response module 1301 and the trajectory screening module 1302, reference may be made to the description of step S207 and step S208 in the foregoing embodiment corresponding to FIG. 8. Details are not described herein again.

Figure 14:
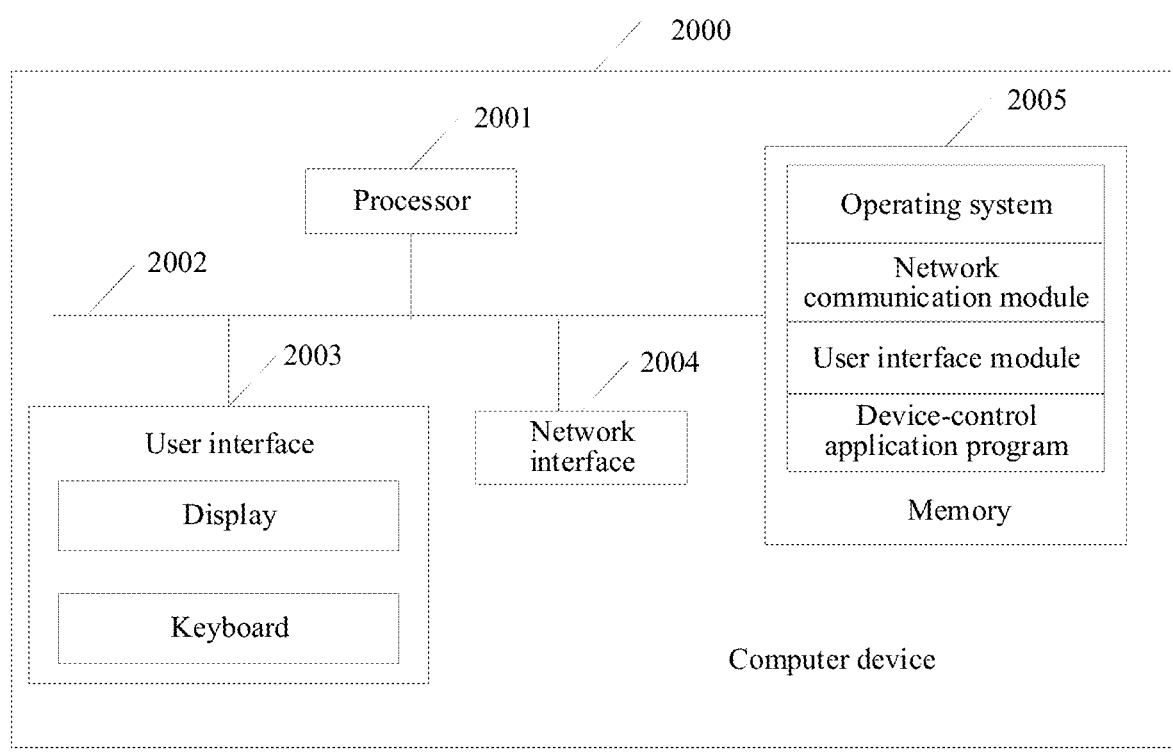
FIG. 14 is a schematic structural diagram of another computer device according to an embodiment of this application.

Further, FIG. 14 is a schematic structural diagram of another computer device according to an embodiment of this application. As shown in FIG. 14, the computer device 2000 may be the target server 2000 in the foregoing embodiment corresponding to FIG. 1. The computer device 2000 may include: a processor 2001, a network interface 2004, and a memory 2005. In addition, the computer device 2000 may include: a user interface 2003 and at least one communication bus 2002. The communication bus 2002 is configured to implement connection and communication between these components. The user interface 2003 may include a display and a keyboard. In some embodiments, the user interface 2003 may further include a standard wired interface and a wireless interface. In some embodiments, the network interface 2004 may include a standard wired interface and a standard wireless interface (such as a Wi-Fi interface). The memory 2004 may be a high-speed RAM, or may be a non-volatile memory, for example, at least one magnetic disk memory. In some embodiments, the memory 2005 may be at least one storage apparatus that is located far away from the foregoing processor 2001. As shown in FIG. 14, the memory 2005 used as a computer storage medium may include an operating system, a network communication module, a user interface module, and a device-control application program.

In the computer device 2000 shown in FIG. 14, the network interface 2004 may be configured to provide a network communication function. The user interface 2003 is mainly configured to provide an input interface for a user. The processor 2001 may be configured to invoke the device-control application program stored in the memory 2005, to implement the following operations: obtaining, in response to a trajectory obtaining request for a target pixel in a key video frame, trajectory information associated with a target video, the key video frame being a video frame in the target video, the target pixel being a pixel in the key video frame, the trajectory information being determined by location information of pixels in each video frame of the target video; and screening the trajectory information associated with the target video to obtain target trajectory information associated with location information of the target pixel in the key video frame, and returning the target trajectory information, the target trajectory information including target location information, the target location information being used for triggering display of multimedia information associated with the target pixel in a next video frame following the key video frame.

It is to be understood that the computer device 2000 described in this embodiment of the present application can implement the descriptions of the video data processing method in the foregoing embodiment corresponding to FIG. 8, and can also implement the descriptions of the video data processing apparatus 2 in the foregoing embodiment corresponding to FIG. 13. Details are not described herein again. In addition, the description of beneficial effects of using the same method are not described herein again.

In addition, embodiments of this application further provide a computer storage medium. The computer storage medium stores a computer program executed by the video data processing apparatus 2 mentioned above, and the computer program includes program instructions. When executing the program instructions, the processor can perform the descriptions of the video data processing method in the foregoing embodiment corresponding to FIG. 8. Therefore, details are not described herein again. In addition, the description of beneficial effects of using the same method are not described herein again. For technical details that are not disclosed in the computer storage medium embodiments of this application, refer to the descriptions of the method embodiments of this application.

Figure 15:
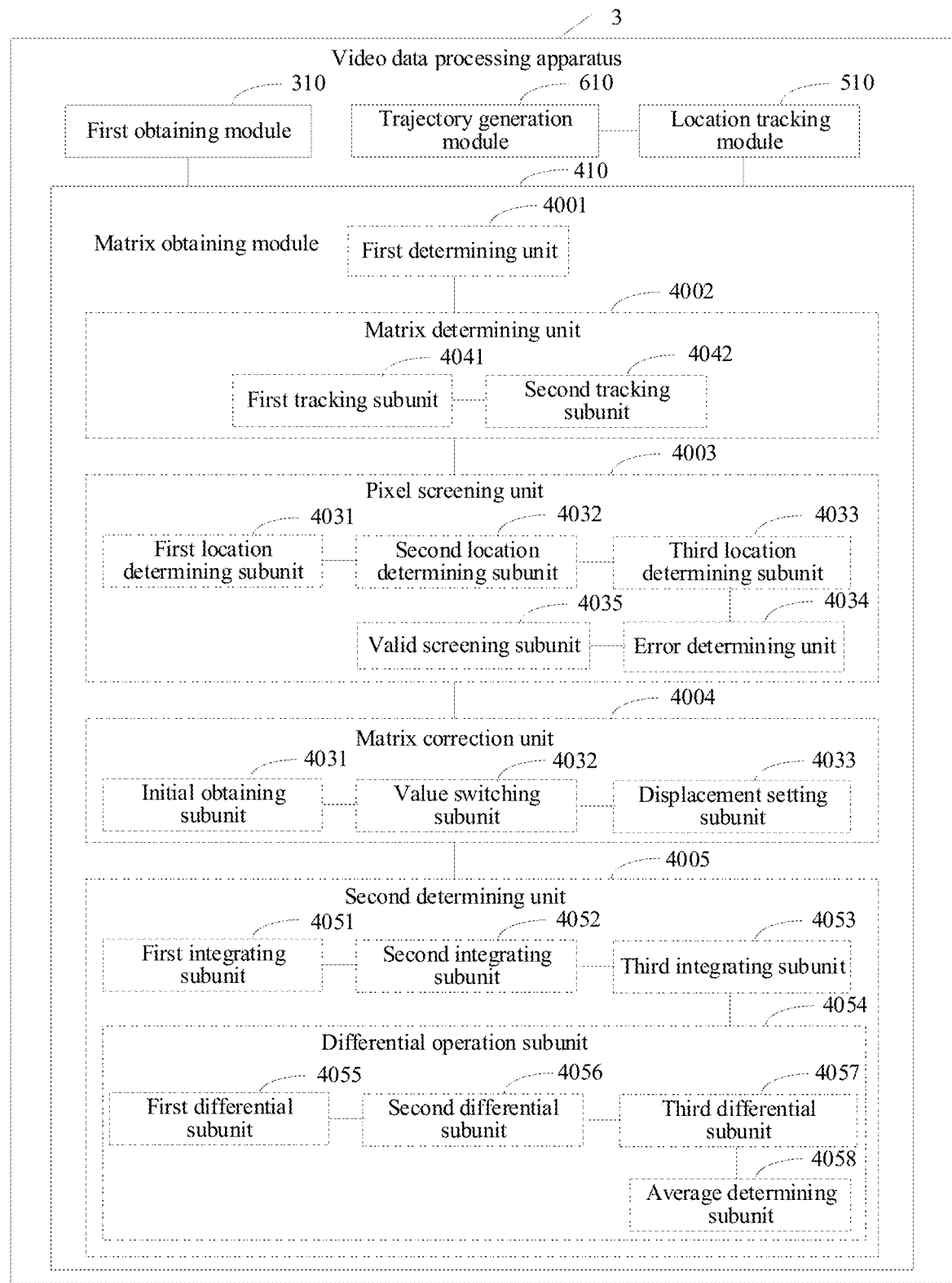
FIG. 15 is a schematic structural diagram of still another video data processing apparatus according to an embodiment of this application.

Further, FIG. 15 is a schematic structural diagram of still another video data processing apparatus according to an embodiment of this application. As shown in FIG. 15, the video data processing apparatus 3 may be applicable to the server 2000 in the foregoing embodiment corresponding to FIG. 1, or may be applicable to the target user terminal in the foregoing embodiment corresponding to FIG. 1. The video data processing apparatus 3 may include: a first obtaining module 310, a matrix obtaining module 410, a location tracking module 510, and trajectory generation module 610.

The first obtaining module 310 is configured to obtain a first video frame and a second video frame adjacent to each other from a target video.

The matrix obtaining module 410 is configured to determine an average displacement matrix corresponding to the first video frame based on an optical flow tracking rule corresponding to the target video, pixels in the first video frame, and pixels in the second video frame.

The matrix obtaining module 410 includes: a first determining unit 4001, a matrix determining unit 4002, a pixel screening unit 4003, a matrix correction unit 4004, and a second determining unit 4005.

The first determining unit 4001 is configured to: obtain the optical flow tracking rule corresponding to the target video, determine the location information of the pixels in the first video frame as first location information, and determine location information of the pixels in the second video frame as second location information.

The matrix determining unit 4002 is configured to obtain a forward displacement matrix corresponding to the first video frame and a backward displacement matrix corresponding to the second video frame based on the optical flow tracking rule, the first location information of the pixels in the first video frame, and the second location information of the pixels in the second video frame.

The matrix determining unit 4002 includes: a first tracking subunit 4021 and a second tracking subunit 4022.

The first tracking subunit 4021 is configured to: forward map the pixels in the first video frame to the second video frame based on the first location information of the pixels in the first video frame and the optical flow tracking rule, determine, in the second video frame, second location information of first mapped points obtained through the mapping, and determine the forward displacement matrix corresponding to the first video frame based on the first location information of the pixels and the second location information of the first mapped points.

The second tracking subunit 4022 is configured to: backward map the first mapped points in the second video frame to the first video frame based on the second location information of the pixels in the second video frame and the optical flow tracking rule, determine, in the first video frame, third location information of second mapped points obtained through the mapping, and determine the backward displacement matrix corresponding to the second video frame based on the second location information of the first mapped points and the third location information of the second mapped points.

For specific implementations of the first tracking subunit 4021 and the second tracking subunit 4022, reference may be made to the description of the cloud forward-backward optical flow method in the foregoing embodiment corresponding to FIG. 8. Details are not described herein again.

The pixel screening unit 4003 is configured to determine pixels meeting a target screening condition in the pixels as valid pixels based on the first location information of the pixels in the first video frame, the forward displacement matrix, and the backward displacement matrix.

The pixel screening unit 4003 includes: a first location determining subunit 4031, a second location determining subunit 4032, a third location determining subunit 4033, an error determining subunit 4034, and a valid screening subunit 4035.

The first location determining subunit 4031 is configured to: obtain a first pixel from the pixels in the first video frame, determine first location information of the first pixel in the first video frame, and determine, in the forward displacement matrix, a first transverse displacement and a first longitudinal displacement that correspond to the first pixel.

The second location determining subunit 4032 is configured to: forward map the first pixel to the second video frame based on the first location information of the first pixel and the first transverse displacement and the first longitudinal displacement that correspond to the first pixel, and determine, in the second video frame, second location information of a second pixel obtained through the mapping.

The third location determining subunit 4033 is configured to: determine, in the backward displacement matrix, a second transverse displacement and a second longitudinal displacement that correspond to the second pixel, backward map the second pixel to the first video frame based on the second location information of the second pixel and the second transverse displacement and the second longitudinal displacement that correspond to the second pixel, and determine, in the first video frame, third location information of a third pixel obtained through the mapping.

The error determining subunit 4034 is configured to: determine an error distance between the first pixel and the third pixel based on the first location information of the first pixel and the third location information of the third pixel, and determine, according to the first location information of the first pixel and the second location information of the second pixel, a correlation coefficient between an image block including the first pixel and an image block including the second pixel.

The valid screening subunit 4035 is configured to determine pixels of which the error distance is less than an error distance threshold and the correlation coefficient is greater than or equal to a correlation coefficient threshold in the pixels as the valid pixels.

For specific implementations of the first location determining subunit 4031, the second location determining subunit 4032, the third location determining subunit 4033, the error determining subunit 4034, and the valid screening subunit 4035, reference may be made to the description of the specific process of determining the valid pixel in the foregoing embodiment corresponding to FIG. 8. Details are not described herein again.

The matrix correction unit 4004 is configured to correct, based on the valid pixels, an initial state matrix corresponding to the first video frame and the forward displacement matrix, to obtain a target state matrix and a target displacement matrix that correspond to the first video frame.

The matrix correction unit 4004 includes: an initial obtaining subunit 4041, a value switching subunit 4042, and a displacement setting subunit 4043.

The initial obtaining subunit 4041 is configured to obtain the initial state matrix corresponding to the first video frame, a state value of each matrix element in the initial state matrix being a first value, each matrix element being corresponding to one pixel in the pixels.

The value switching subunit 4042 is configured to: switch state values of matrix elements corresponding to the valid pixels from the first value to a second value in the initial state matrix, and determine the initial state matrix including the second value as the target state matrix corresponding to the first video frame.

The displacement setting subunit 4043 is configured to: set, in the forward displacement matrix, displacements of matrix elements corresponding to the remaining pixels to the first value, and determine the forward displacement matrix including the first value as the target displacement matrix, the remaining pixels being pixels other than the valid pixels in the pixels.

The displacement setting subunit 4043 is specifically configured to: when the forward displacement matrix includes an initial transverse displacement matrix and an initial longitudinal displacement matrix, set, in the initial transverse displacement matrix, first transverse displacements of the matrix elements corresponding to the remaining pixels to the first value, and determine the initial transverse displacement matrix including the first value as a transverse displacement matrix corresponding to the first video frame.

The displacement setting subunit 4043 is further specifically configured to: set, in the initial longitudinal displacement matrix, first longitudinal displacements of the matrix elements corresponding to the remaining pixels to the first value, and determine the initial longitudinal displacement matrix including the first value as a longitudinal displacement matrix corresponding to the first video frame.

The displacement setting subunit 4043 is further specifically configured to determine the transverse displacement matrix corresponding to the first video frame and the longitudinal displacement matrix corresponding to the first video frame as the target displacement matrix.

For specific implementations of the initial obtaining subunit 4041, the value switching subunit 4042, and the displacement setting subunit 4043, reference may be made to the description of correcting the initial state matrix and the forward displacement matrix in the foregoing embodiment corresponding to FIG. 8. Details are not described herein again.

The second determining unit 4005 is configured to determine the average displacement matrix corresponding to the first video frame based on the target state matrix and the target displacement matrix.

The second determining unit 4005 includes: a first integrating subunit 4051, a second integrating subunit 4052, a third integrating subunit 4053, and a differential operation subunit 4054.

The first integrating subunit 4051 is configured to perform a displacement integral operation on the target state matrix in the first video frame, to obtain a state integral matrix corresponding to the pixels in the first video frame.

The second integrating subunit 4052 is configured to perform a displacement integral operation on a transverse displacement matrix in the target state matrix in the first video frame, to obtain a transverse displacement integral matrix corresponding to the pixels in the first video frame.

The third integrating subunit 4053 is configured to perform a displacement integral operation on a longitudinal displacement matrix in the target state matrix in the first video frame, to obtain a longitudinal displacement integral matrix corresponding to the pixels in the first video frame.

The differential operation subunit 4054 is configured to: determine, in the first video frame, a differential region corresponding to a displacement differential operation, and determine the average displacement matrix corresponding to the first video frame based on size information of the differential region, the state integral matrix, the transverse displacement integral matrix, and the longitudinal displacement integral matrix.

The differential operation subunit 4054 includes: a first differential subunit 4055, a second differential subunit 4056, a third differential subunit 4057, and an average determining subunit 4058.

The first differential subunit 4055 is configured to perform a displacement differential operation on the state integral matrix based on length information and width information that correspond to the differential region, to obtain a state differential matrix corresponding to the first video frame.

The second differential subunit 4056 is configured to perform a displacement differential operation on the transverse displacement integral matrix and the longitudinal displacement integral matrix respectively based on the length information and the width information that correspond to the differential region, to obtain a transverse displacement differential matrix and a longitudinal displacement differential matrix that correspond to the first video frame.

The third differential subunit 4057 is configured to: determine a ratio of the transverse displacement differential matrix to the state differential matrix as a transverse average displacement matrix, and determine a ratio of the longitudinal displacement differential matrix to the state differential matrix as a longitudinal average displacement matrix.

The average determining subunit 4058 is configured to determine the transverse average displacement matrix and the longitudinal average displacement matrix as the average displacement matrix corresponding to the first video frame.

For specific implementations of the first integrating subunit 4051, the second integrating subunit 4052, the third integrating subunit 4053, and the differential operation subunit 4054, reference may be made to the description of the cloud displacement integration method and the cloud displacement difference method in the foregoing embodiment corresponding to FIG. 8. Details are not described herein again.

For specific implementations of the first determining unit 4001, the matrix determining unit 4002, the pixel screening unit 4003, the matrix correction unit 4004, and the second determining unit 4005, reference may be made to the description of step S202 in the foregoing embodiment corresponding to FIG. 8. Details are not described herein again.

The location tracking module 510 is configured to: track location information of the pixels in the first video frame based on the average displacement matrix, and determine location information of pixels being tracked in the second video frame.

The trajectory generation module 610 is configured to generate, based on the location information of the pixels in the first video frame and the location information of the pixels being tracked in the second video frame, trajectory information associated with the target video, the trajectory information including target trajectory information used for tracking and displaying multimedia information associated with a target pixel in the target video.

For specific implementations of the first obtaining module 310, the matrix obtaining module 410, the location tracking module 510, and the trajectory generation module 610, reference may be made to the description of step S201 to step S204 in the foregoing embodiment corresponding to FIG. 8. Details are not described herein again.

Figure 16:
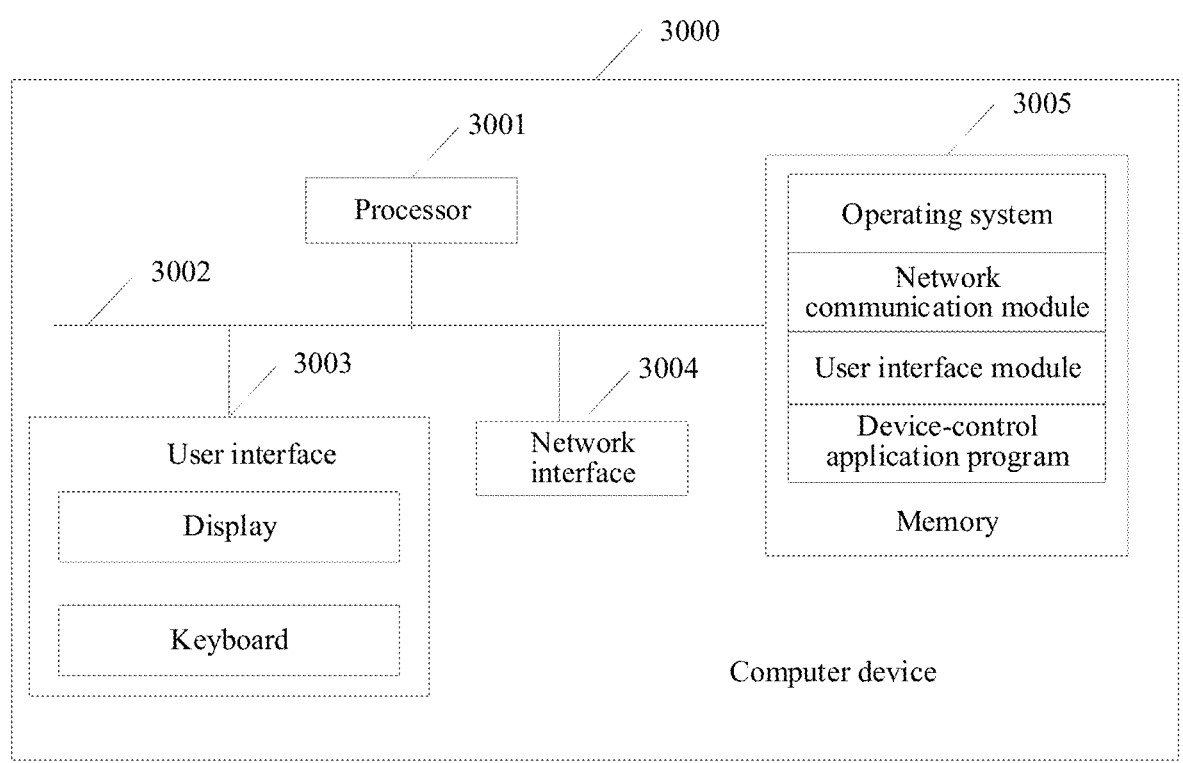
FIG. 16 is a schematic structural diagram of still another computer device according to an embodiment of this application.

Further, FIG. 16 is a schematic structural diagram of still another computer device according to an embodiment of this application. As shown in FIG. 16, the computer device 3000 may be applicable to the server 2000 in the foregoing embodiment corresponding to FIG. 1. The computer device 3000 may include: a processor 3001, a network interface 3004, and a memory 3005, as well as the computer device 3000 may further include: a user interface 3003 and at least one communication bus 3002. The communication bus 3002 is configured to implement connection and communication between these components. The user interface 3003 may include a display and a keyboard. In some embodiments, the user interface 3003 may further include a standard wired interface and a wireless interface. In some embodiments, the network interface 3004 may include a standard wired interface and a standard wireless interface (such as a Wi-Fi interface). The memory 3004 may be a high-speed RAM, or may be a non-volatile memory, for example, at least one magnetic disk memory. In some embodiments, the memory 3005 may be at least one storage apparatus that is located far away from the foregoing processor 3001. As shown in FIG. 16, the memory 3005 used as a computer storage medium may include an operating system, a network communication module, a user interface module, and a device-control application program.

In the computer device 3000 shown in FIG. 16, the network interface 3004 may be configured to provide a network communication function. The user interface 3003 is mainly configured to provide an input interface for a user.

The processor 3001 may be configured to invoke the device-control application program stored in the memory 3005, to implement the following operations: obtaining a first video frame and a second video frame adjacent to each other from a target video; determining an average displacement matrix corresponding to the first video frame based on an optical flow tracking rule corresponding to the target video, pixels in the first video frame, and pixels in the second video frame; tracking location information of the pixels in the first video frame based on the average displacement matrix, and determining location information of pixels being tracked in the second video frame; and generating, based on the location information of the pixels in the first video frame and the location information of the pixels being tracked in the second video frame, trajectory information associated with the target video, the trajectory information including target trajectory information used for tracking and displaying multimedia information associated with a target pixel in the target video.

It is to be understood that the computer device 3000 described in this embodiment of the present application can implement the descriptions of the video data processing method in the foregoing embodiment corresponding to FIG. 8, and can also implement the descriptions of the video data processing apparatus 3 in the foregoing embodiment corresponding to FIG. 15. Details are not described herein again. In addition, the description of beneficial effects of using the same method are not described herein again.

In addition, embodiments of this application further provide a computer storage medium. The computer storage medium stores a computer program executed by the video data processing apparatus 3 mentioned above, and the computer program includes program instructions. When executing the program instructions, the processor can perform the descriptions of the video data processing method in the foregoing embodiment corresponding to FIG. 8. Therefore, details are not described herein again. In addition, the description of beneficial effects of using the same method are not described herein again. For technical details that are not disclosed in the computer storage medium embodiments of this application, refer to the descriptions of the method embodiments of this application.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A video data processing method, comprising:
obtaining a first video frame and a second video frame adjacent to the first video frame from a target video;
determining an average displacement matrix corresponding to the first video frame based on an optical flow tracking rule corresponding to the target video, pixels in the first video frame, and pixels in the second video frame, comprising:
  obtaining the optical flow tracking rule corresponding to the target video, determining the location information of the pixels in the first video frame as first location information, and determining location information of the pixels in the second video frame as second location information,
  obtaining a forward displacement matrix corresponding to the first video frame and a backward displacement matrix corresponding to the second video frame based on the optical flow tracking rule, the first location information of the pixels in the first video frame, and the second location information of the pixels in the second video frame,
  determining pixels meeting a target screening condition in the pixels as valid pixels based on the first location information of the pixels in the first video frame, the forward displacement matrix, and the backward displacement matrix,
  correcting, based on the valid pixels, an initial state matrix corresponding to the first video frame and the forward displacement matrix, to obtain a target state matrix and a target displacement matrix that correspond to the first video frame, and
  determining the average displacement matrix corresponding to the first video frame based on the target state matrix and the target displacement matrix,
tracking location information of the pixels in the first video frame based on the average displacement matrix, and determining location information of pixels being tracked in the second video frame; and
generating, based on the location information of the pixels in the first video frame and the location information of the pixels being tracked in the second video frame, trajectory information associated with the target video.

2. The method according to claim 1, further comprising:
determining, in response to a trigger operation on the target video, a target pixel in a key video frame of the target video, and obtaining multimedia information associated with the target pixel, the key video frame being a video frame in which the trigger operation is located, and the target pixel being a pixel corresponding to the trigger operation in the key video frame;
identifying a trajectory obtaining request corresponding to the target pixel based on location information of the target pixel in the key video frame;
determining, based on the trajectory obtaining request, the key video frame as the first video frame, and a next video frame following the key video frame as the second frame, and performing the steps of determining the average displacement matrix and tracking the location information of the pixels in the first video frame to obtain target trajectory information associated with the location information of the target pixel in the key video frame; and
displaying, when the next video frame following the key video frame is played, the multimedia information based on the location information of the target pixel in the next video frame following the key video frame in the target trajectory information.

3. The method according to claim 1, further comprising:
obtaining, in response to a trajectory obtaining request for a target pixel in a key video frame, the trajectory information associated with the target video, the key video frame being the first video frame in the target video, the target pixel being a pixel in the key video frame, and a next video frame following the key video frame being the second video frame; and
screening the trajectory information associated with the target video to obtain target trajectory information associated with location information of the target pixel in the key video frame, and returning the target trajectory information, the target trajectory information comprising target location information, the target location information being used for triggering display of multimedia information associated with the target pixel in the next video frame following the key video frame.

4. The method according to claim 1, wherein the obtaining a forward displacement matrix corresponding to the first video frame and a backward displacement matrix corresponding to the second video frame based on the optical flow tracking rule, the first location information of the pixels in the first video frame, and the second location information of the pixels in the second video frame comprises:
forward mapping the pixels in the first video frame to the second video frame based on the first location information of the pixels in the first video frame and the optical flow tracking rule;
determining, in the second video frame, second location information of first mapped points obtained through the mapping, and determining the forward displacement matrix corresponding to the first video frame based on the first location information of the pixels and the second location information of the first mapped points;
backward mapping the pixels in the second video frame to the first video frame based on the second location information of the pixels in the second video frame and the optical flow tracking rule; and
determining, in the first video frame, third location information of second mapped points obtained through the mapping, and determining the backward displacement matrix corresponding to the second video frame based on the second location information of the first mapped points and the third location information of the second mapped points.

5. The method according to claim 1, wherein the determining pixels meeting a target screening condition in the pixels as valid pixels based on the first location information of the pixels in the first video frame, the forward displacement matrix, and the backward displacement matrix, comprises:
obtaining a first pixel from the pixels in the first video frame, determining first location information of the first pixel in the first video frame, and determining, in the forward displacement matrix, a first transverse displacement and a first longitudinal displacement that correspond to the first pixel;
forward mapping the first pixel to the second video frame based on the first location information of the first pixel and the first transverse displacement and the first longitudinal displacement that correspond to the first pixel, and determining, in the second video frame, second location information of a second pixel obtained through the mapping;

determining, in the backward displacement matrix, a second transverse displacement and a second longitudinal displacement that correspond to the second pixel, backward mapping the second pixel to the first video frame based on the second location information of the second pixel and the second transverse displacement and the second longitudinal displacement that correspond to the second pixel, and determining, in the first video frame, third location information of a third pixel obtained through the mapping;

determining an error distance between the first pixel and the third pixel based on the first location information of the first pixel and the third location information of the third pixel, and determining, according to the first location information of the first pixel and the second location information of the second pixel, a correlation coefficient between an image block comprising the first pixel and an image block comprising the second pixel; and determining pixels between which the error distance is less than an error distance threshold and the correlation coefficient is greater than or equal to a correlation coefficient threshold in the pixels as the valid pixels.

6. The method according to claim 1, wherein the correcting, based on the valid pixels, an initial state matrix corresponding to the first video frame and the forward displacement matrix, to obtain a target state matrix and a target displacement matrix that correspond to the first video frame comprises:

obtaining the initial state matrix corresponding to the first video frame, a state value of each matrix element in the initial state matrix being a first value, each matrix element being corresponding to one pixel in the pixels;

switching state values of matrix elements corresponding to the valid pixels from a first value to a second value in the initial state matrix, and determining the initial state matrix comprising the second value as the target state matrix corresponding to the first video frame; and setting, in the forward displacement matrix, displacements of matrix elements corresponding to the remaining pixels to the first value, and determining the forward displacement matrix comprising the first value as the target displacement matrix, the remaining pixels being pixels other than the valid pixels.

7. The method according to claim 6, wherein the setting, in the forward displacement matrix, displacements of matrix elements corresponding to the remaining pixels to the first value, and determining the forward displacement matrix comprising the first value as the target displacement matrix comprises:

when the forward displacement matrix comprises an initial transverse displacement matrix and an initial longitudinal displacement matrix, setting, in the initial transverse displacement matrix, first transverse displacements of the matrix elements corresponding to the remaining pixels to the first value, and determining the initial transverse displacement matrix comprising the first value as a transverse displacement matrix corresponding to the first video frame;

setting, in the initial longitudinal displacement matrix, first longitudinal displacements of the matrix elements corresponding to the remaining pixels to the first value, and determining the initial longitudinal displacement matrix comprising the first value as a longitudinal displacement matrix corresponding to the first video frame; and determining the transverse displacement matrix corresponding to the first video frame and the longitudinal displacement matrix corresponding to the first video frame as the target displacement matrix.

8. The method according to claim 1, wherein the determining the average displacement matrix corresponding to the first video frame based on the target state matrix and the target displacement matrix comprises:

performing a displacement integral operation on the target state matrix in the first video frame, to obtain a state integral matrix corresponding to the pixels in the first video frame;

performing a displacement integral operation on a transverse displacement matrix in the target state matrix in the first video frame, to obtain a transverse displacement integral matrix corresponding to the pixels in the first video frame;

performing a displacement integral operation on a longitudinal displacement matrix in the target state matrix in the first video frame, to obtain a longitudinal displacement integral matrix corresponding to the pixels in the first video frame; and determining, in the first video frame, a differential region corresponding to a displacement differential operation, and determining the average displacement matrix corresponding to the first video frame based on size information of the differential region, the state integral matrix, the transverse displacement integral matrix, and the longitudinal displacement integral matrix.

9. The method according to claim 8, wherein the determining the average displacement matrix corresponding to the first video frame based on size information of the differential region, the state integral matrix, the transverse displacement integral matrix, and the longitudinal displacement integral matrix comprises:

performing a displacement differential operation on the state integral matrix based on length information and width information that correspond to the differential region, to obtain a state differential matrix corresponding to the first video frame;

performing a displacement differential operation on the transverse displacement integral matrix and the longitudinal displacement integral matrix respectively based on the length information and the width information that correspond to the differential region, to obtain a transverse displacement differential matrix and a longitudinal displacement differential matrix that correspond to the first video frame;

determining a ratio of the transverse displacement differential matrix to the state differential matrix as a transverse average displacement matrix, and determining a ratio of the longitudinal displacement differential matrix to the state differential matrix as a longitudinal average displacement matrix; and determining the transverse average displacement matrix and the longitudinal average displacement matrix as the average displacement matrix corresponding to the first video frame.

10. A computer device, comprising at least one processor, at least one memory, and a network interface, the at least one processor being connected to the at least one memory and the network interface, the network interface being configured to provide a data communication function, the at least one memory being configured to store a computer program, the at least one processor being configured to invoke the computer program to perform:

obtaining a first video frame and a second video frame adjacent to the first video frame from a target video;

determining an average displacement matrix corresponding to the first video frame based on an optical flow tracking rule corresponding to the target video, pixels in the first video frame, and pixels in the second video frame, comprising:

obtaining the optical flow tracking rule corresponding to the target video, determining the location information of the pixels in the first video frame as first location information, and determining location information of the pixels in the second video frame as second location information;

obtaining a forward displacement matrix corresponding to the first video frame and a backward displacement matrix corresponding to the second video frame based on the optical flow tracking rule, the first location information of the pixels in the first video frame, and the second location information of the pixels in the second video frame;

determining pixels meeting a target screening condition in the pixels as valid pixels based on the first location information of the pixels in the first video frame, the forward displacement matrix, and the backward displacement matrix;

correcting, based on the valid pixels, an initial state matrix corresponding to the first video frame and the forward displacement matrix, to obtain a target state matrix and a target displacement matrix that correspond to the first video frame; and determining the average displacement matrix corresponding to the first video frame based on the target state matrix and the target displacement matrix;

tracking location information of the pixels in the first video frame based on the average displacement matrix, and determining location information of pixels being tracked in the second video frame; and generating, based on the location information of the pixels in the first video frame and the location information of the pixels being tracked in the second video frame, trajectory information associated with the target video.

11. A non-transitory computer-readable storage medium, storing a computer program, the computer program comprising program instructions, the program instructions, when executed by at least one processor, causing the at least one processor to perform:

obtaining a first video frame and a second video frame adjacent to the first video frame from a target video;

determining an average displacement matrix corresponding to the first video frame based on an optical flow tracking rule corresponding to the target video, pixels in the first video frame, and pixels in the second video frame, comprising:

obtaining the optical flow tracking rule corresponding to the target video, determining the location information of the pixels in the first video frame as first location information, and determining location information of the pixels in the second video frame as second location information;

obtaining a forward displacement matrix corresponding to the first video frame and a backward displacement matrix corresponding to the second video frame based on the optical flow tracking rule, the first location information of the pixels in the first video frame, and the second location information of the pixels in the second video frame;

determining pixels meeting a target screening condition in the pixels as valid pixels based on the first location information of the pixels in the first video frame, the forward displacement matrix, and the backward displacement matrix;

correcting, based on the valid pixels, an initial state matrix corresponding to the first video frame and the forward displacement matrix, to obtain a target state matrix and a target displacement matrix that correspond to the first video frame; and determining the average displacement matrix corresponding to the first video frame based on the target state matrix and the target displacement matrix;

tracking location information of the pixels in the first video frame based on the average displacement matrix, and determining location information of pixels being tracked in the second video frame; and generating, based on the location information of the pixels in the first video frame and the location information of the pixels being tracked in the second video frame, trajectory information associated with the target video.

12. The computer-readable storage medium according to claim 11, wherein the program instructions further cause the at least one processor to perform:

determining, in response to a trigger operation on the target video, a target pixel in a key video frame of the target video, and obtaining multimedia information associated with the target pixel, the key video frame being a video frame in which the trigger operation is located, and the target pixel being a pixel corresponding to the trigger operation in the key video frame;

identifying a trajectory obtaining request corresponding to the target pixel based on location information of the target pixel in the key video frame;

determining, based on the trajectory obtaining request, the key video frame as the first video frame, and a next video frame following the key video frame as the second frame, and performing the steps of determining the average displacement matrix and tracking the location information of the pixels in the first video frame to obtain target trajectory information associated with the location information of the target pixel in the key video frame; and displaying, when the next video frame following the key video frame is played, the multimedia information based on the location information of the target pixel in the next video frame following the key video frame in the target trajectory information.

13. The computer-readable storage medium according to claim 11, wherein the obtaining a forward displacement matrix corresponding to the first video frame and a backward displacement matrix corresponding to the second video frame based on the optical flow tracking rule, the first location information of the pixels in the first video frame, and the second location information of the pixels in the second video frame comprises:

forward mapping the pixels in the first video frame to the second video frame based on the first location information of the pixels in the first video frame and the optical flow tracking rule;

determining, in the second video frame, second location information of first mapped points obtained through the mapping, and determining the forward displacement matrix corresponding to the first video frame based on the first location information of the pixels and the second location information of the first mapped points;

backward mapping the pixels in the second video frame to the first video frame based on the second location information of the pixels in the second video frame and the optical flow tracking rule; and determining, in the first video frame, third location information of second mapped points obtained through the mapping, and determining the backward displacement matrix corresponding to the second video frame based on the second location information of the first mapped points and the third location information of the second mapped points.

14. The computer-readable storage medium according to claim 11, wherein the determining pixels meeting a target screening condition in the pixels as valid pixels based on the first location information of the pixels in the first video frame, the forward displacement matrix, and the backward displacement matrix, comprises:

obtaining a first pixel from the pixels in the first video frame, determining first location information of the first pixel in the first video frame, and determining, in the forward displacement matrix, a first transverse displacement and a first longitudinal displacement that correspond to the first pixel;

forward mapping the first pixel to the second video frame based on the first location information of the first pixel and the first transverse displacement and the first longitudinal displacement that correspond to the first pixel, and determining, in the second video frame, second location information of a second pixel obtained through the mapping;

determining, in the backward displacement matrix, a second transverse displacement and a second longitudinal displacement that correspond to the second pixel, backward mapping the second pixel to the first video frame based on the second location information of the second pixel and the second transverse displacement and the second longitudinal displacement that correspond to the second pixel, and determining, in the first video frame, third location information of a third pixel obtained through the mapping;

determining an error distance between the first pixel and the third pixel based on the first location information of the first pixel and the third location information of the third pixel, and determining, according to the first location information of the first pixel and the second location information of the second pixel, a correlation coefficient between an image block comprising the first pixel and an image block comprising the second pixel; and determining pixels between which the error distance is less than an error distance threshold and the correlation coefficient is greater than or equal to a correlation coefficient threshold in the pixels as the valid pixels.

15. The computer-readable storage medium according to claim 11, wherein the correcting, based on the valid pixels, an initial state matrix corresponding to the first video frame and the forward displacement matrix, to obtain a target state matrix and a target displacement matrix that correspond to the first video frame comprises:

obtaining the initial state matrix corresponding to the first video frame, a state value of each matrix element in the initial state matrix being a first value, each matrix element being corresponding to one pixel in the pixels;

switching state values of matrix elements corresponding to the valid pixels from a first value to a second value in the initial state matrix, and determining the initial state matrix comprising the second value as the target state matrix corresponding to the first video frame; and setting, in the forward displacement matrix, displacements of matrix elements corresponding to the remaining pixels to the first value, and determining the forward displacement matrix comprising the first value as the target displacement matrix, the remaining pixels being pixels other than the valid pixels.

16. The computer-readable storage medium according to claim 15, wherein the setting, in the forward displacement matrix, displacements of matrix elements corresponding to the remaining pixels to the first value, and determining the forward displacement matrix comprising the first value as the target displacement matrix comprises:

when the forward displacement matrix comprises an initial transverse displacement matrix and an initial longitudinal displacement matrix, setting, in the initial transverse displacement matrix, first transverse displacements of the matrix elements corresponding to the remaining pixels to the first value, and determining the initial transverse displacement matrix comprising the first value as a transverse displacement matrix corresponding to the first video frame;

setting, in the initial longitudinal displacement matrix, first longitudinal displacements of the matrix elements corresponding to the remaining pixels to the first value, and determining the initial longitudinal displacement matrix comprising the first value as a longitudinal displacement matrix corresponding to the first video frame; and determining the transverse displacement matrix corresponding to the first video frame and the longitudinal displacement matrix corresponding to the first video frame as the target displacement matrix.

17. The computer-readable storage medium according to claim 11, wherein the determining the average displacement matrix corresponding to the first video frame based on the target state matrix and the target displacement matrix comprises:

performing a displacement integral operation on the target state matrix in the first video frame, to obtain a state integral matrix corresponding to the pixels in the first video frame;

performing a displacement integral operation on a transverse displacement matrix in the target state matrix in the first video frame, to obtain a transverse displacement integral matrix corresponding to the pixels in the first video frame;

performing a displacement integral operation on a longitudinal displacement matrix in the target state matrix in the first video frame, to obtain a longitudinal displacement integral matrix corresponding to the pixels in the first video frame; and determining, in the first video frame, a differential region corresponding to a displacement differential operation, and determining the average displacement matrix corresponding to the first video frame based on size information of the differential region, the state integral matrix, the transverse displacement integral matrix, and the longitudinal displacement integral matrix.

18. The computer-readable storage medium according to claim 17, wherein the determining the average displacement matrix corresponding to the first video frame based on size information of the differential region, the state integral matrix, the transverse displacement integral matrix, and the longitudinal displacement integral matrix comprises:

performing a displacement differential operation on the state integral matrix based on length information and width information that correspond to the differential region, to obtain a state differential matrix corresponding to the first video frame;

performing a displacement differential operation on the transverse displacement integral matrix and the longitudinal displacement integral matrix respectively based on the length information and the width information that correspond to the differential region, to obtain a transverse displacement differential matrix and a longitudinal displacement differential matrix that correspond to the first video frame;

determining a ratio of the transverse displacement differential matrix to the state differential matrix as a transverse average displacement matrix, and determining a ratio of the longitudinal displacement differential matrix to the state differential matrix as a longitudinal average displacement matrix; and determining the transverse average displacement matrix and the longitudinal average displacement matrix as the average displacement matrix corresponding to the first video frame.

\* \* \* \* \*